United States Patent
Sato et al.

(10) Patent No.: US 10,107,335 B2
(45) Date of Patent: Oct. 23, 2018

(54) BEARING COMPONENT AND ROLLING BEARING

(71) Applicant: NTN Corporation, Osaka (JP)

(72) Inventors: Daisuke Sato, Kuwana (JP); Chikara Ohki, Kuwana (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 14/895,470

(22) PCT Filed: May 28, 2014

(86) PCT No.: PCT/JP2014/064118
§ 371 (c)(1),
(2) Date: Dec. 2, 2015

(87) PCT Pub. No.: WO2014/196431
PCT Pub. Date: Dec. 11, 2014

(65) Prior Publication Data
US 2016/0131188 A1   May 12, 2016

(30) Foreign Application Priority Data

| Jun. 6, 2013 | (JP) | 2013-120138 |
| Jun. 6, 2013 | (JP) | 2013-120139 |
| Jun. 6, 2013 | (JP) | 2013-120140 |

(51) Int. Cl.
| F16C 33/62 | (2006.01) |
| C21D 9/40 | (2006.01) |
| C23C 8/32 | (2006.01) |
| C21D 1/06 | (2006.01) |
(Continued)

(52) U.S. Cl.
CPC .......... *F16C 33/62* (2013.01); *C21D 1/06* (2013.01); *C21D 1/25* (2013.01); *C21D 9/40* (2013.01);
(Continued)

(58) Field of Classification Search
USPC .......... 384/492; 428/325, 469, 698
See application file for complete search history.

(56) References Cited

U.S. PATENT DOCUMENTS

| 4,650,195 A | 3/1987 | Dreschmann et al. |
| 5,228,377 A | 7/1993 | Watanabe |
(Continued)

FOREIGN PATENT DOCUMENTS

| CN | 1421541 A | 6/2003 |
| CN | 1534212 A | 10/2004 |
(Continued)

OTHER PUBLICATIONS

Ohki "Evaluation of Scratched Contact Fatigue Life with Dent of Carbonitride SUJ2 Steel Whose Surface Nitrogen Content is Controlled" NTN Technical Review No. 78 (2010) p. 24-32.*
(Continued)

*Primary Examiner* — Archene Turner
(74) *Attorney, Agent, or Firm* — McDermott Will & Emery LLP

(57) ABSTRACT

A bearing component composed of steel which contains carbon not less than 0.95 mass % and not more than 1.1 mass %, silicon less than 0.3 mass %, manganese less than 0.5 mass %, sulfur less than 0.008 mass %, and chromium not less than 1.4 mass % and less than 1.6 mass % and is composed of remainder iron and an impurity and having a carbonitrided layer formed at a surface portion including a contact surface is provided. An average concentration of nitrogen in the surface portion is not lower than 0.3 mass % and not higher than 0.6 mass % and variation in nitrogen concentration in the surface portion is not higher than 0.1 mass %. An area ratio of a precipitate in a region where no carbonitrided layer is formed is not higher than 7%.

11 Claims, 22 Drawing Sheets

(51) Int. Cl.

| | | |
|---|---|---|
| *C22C 38/00* | (2006.01) | |
| *C22C 38/18* | (2006.01) | |
| *F16C 33/64* | (2006.01) | |
| *C23C 8/80* | (2006.01) | |
| *C21D 1/25* | (2006.01) | |
| *C22C 38/02* | (2006.01) | |
| *C22C 38/04* | (2006.01) | |
| *C22C 38/42* | (2006.01) | |
| *C22C 38/44* | (2006.01) | |
| *F16C 33/32* | (2006.01) | |
| *F16C 33/36* | (2006.01) | |
| *F16C 19/06* | (2006.01) | |
| *F16C 19/36* | (2006.01) | |

(52) U.S. Cl.
CPC ............ *C22C 38/00* (2013.01); *C22C 38/001* (2013.01); *C22C 38/002* (2013.01); *C22C 38/02* (2013.01); *C22C 38/04* (2013.01); *C22C 38/18* (2013.01); *C22C 38/42* (2013.01); *C22C 38/44* (2013.01); *C23C 8/32* (2013.01); *C23C 8/80* (2013.01); *F16C 33/32* (2013.01); *F16C 33/366* (2013.01); *F16C 33/64* (2013.01); *C21D 2211/001* (2013.01); *C21D 2211/004* (2013.01); *F16C 19/06* (2013.01); *F16C 19/364* (2013.01)

(56) References Cited

U.S. PATENT DOCUMENTS

| | | | |
|---|---|---|---|
| 5,338,377 | A | 8/1994 | Mitamura et al. |
| 5,626,974 | A | 5/1997 | Mitamura |
| 6,082,906 | A | 7/2000 | Satou et al. |
| 6,770,152 | B1 | 8/2004 | Okita et al. |
| 7,641,742 | B2 | 1/2010 | Ohki et al. |
| 8,088,230 | B2 | 1/2012 | Ueda et al. |
| 2002/0066502 | A1 | 6/2002 | Tako et al. |
| 2002/0082133 | A1 | 6/2002 | Yoshikawa et al. |
| 2003/0123769 | A1 | 7/2003 | Ohki |
| 2004/0047528 | A1 | 3/2004 | Tsujimoto et al. |
| 2004/0170348 | A1 | 9/2004 | Okugami et al. |
| 2004/0190808 | A1 | 9/2004 | Maeda et al. |
| 2005/0045247 | A1 | 3/2005 | Ohki |
| 2005/0092396 | A1 | 5/2005 | Takemura et al. |
| 2005/0141799 | A1 | 6/2005 | Uyama et al. |
| 2005/0205163 | A1 | 9/2005 | Ohki |
| 2006/0204155 | A1 | 9/2006 | Watanabe et al. |
| 2006/0266440 | A1 | 11/2006 | Tanaka et al. |
| 2007/0034301 | A1 | 2/2007 | Hasegawa et al. |
| 2007/0151633 | A1 | 7/2007 | Ohki et al. |
| 2007/0169850 | A1 | 7/2007 | Ohki et al. |
| 2007/0269336 | A1 | 11/2007 | Ohki et al. |
| 2009/0038713 | A1 | 2/2009 | Ueda et al. |
| 2010/0154937 | A1 | 6/2010 | Ohki |
| 2011/0000583 | A1 | 1/2011 | Kizawa et al. |
| 2012/0014635 | A1 | 1/2012 | Ohki et al. |
| 2012/0051680 | A1 | 3/2012 | Ishikawa et al. |
| 2012/0051682 | A1 | 3/2012 | Ohki |
| 2012/0060634 | A1 | 3/2012 | Ueno |
| 2013/0019666 | A1 | 1/2013 | Ohki |
| 2014/0348454 | A1 | 11/2014 | Ueno et al. |
| 2015/0377293 | A1 | 12/2015 | Sakanaka et al. |

FOREIGN PATENT DOCUMENTS

| | | |
|---|---|---|
| CN | 1605636 A | 4/2005 |
| CN | 1678469 A | 10/2005 |
| CN | 1831303 A | 9/2006 |
| CN | 1910379 A | 2/2007 |
| CN | 100458201 C | 2/2009 |
| CN | 101400809 A | 4/2009 |
| CN | 101970704 A | 2/2011 |
| CN | 102859025 A | 1/2013 |
| EP | 0 626 468 A1 | 11/1994 |
| EP | 1455102 A2 | 9/2004 |
| EP | 1707831 A1 | 10/2006 |
| EP | 2025765 A1 | 2/2009 |
| EP | 2 253 728 A1 | 11/2010 |
| EP | 2298946 A2 | 3/2011 |
| EP | 2345822 A2 | 7/2011 |
| EP | 2554709 A1 | 2/2013 |
| EP | 2642145 A1 | 9/2013 |
| JP | H07-190072 A | 7/1995 |
| JP | 08-067962 A | 3/1996 |
| JP | H09-257041 A | 9/1997 |
| JP | H11-43739 A | 2/1999 |
| JP | H11-125259 A | 5/1999 |
| JP | 2000-145795 A | 5/2000 |
| JP | 2000-161363 A | 6/2000 |
| JP | 2001-323939 A | 11/2001 |
| JP | 2002-89569 A | 3/2002 |
| JP | 2003-13962 A | 1/2003 |
| JP | 2003-21148 A | 1/2003 |
| JP | 2003-226918 A | 8/2003 |
| JP | 2003-287040 A | 10/2003 |
| JP | 2003-301846 A | 10/2003 |
| JP | 2004115903 A | 4/2004 |
| JP | 2004-137605 A | 5/2004 |
| JP | 2004-225743 A | 8/2004 |
| JP | 2004-278782 A | 10/2004 |
| JP | 2004-360732 A | 12/2004 |
| JP | 2005-114148 A | 4/2005 |
| JP | 2005113256 A | 4/2005 |
| JP | 2005-121097 A | 5/2005 |
| JP | 2005-195148 A | 7/2005 |
| JP | 2005-308137 A | 11/2005 |
| JP | 2006-9887 A | 1/2006 |
| JP | 2006-44349 A | 2/2006 |
| JP | 2006-124780 A | 5/2006 |
| JP | 2006-200003 A | 8/2006 |
| JP | 2006-266496 A | 10/2006 |
| JP | 2006-322017 A | 11/2006 |
| JP | 2006-342901 A | 12/2006 |
| JP | 2007-046114 A | 2/2007 |
| JP | 2007-170680 A | 7/2007 |
| JP | 2007-177287 A | 7/2007 |
| JP | 2007-177897 A | 7/2007 |
| JP | 2007-277648 A | 10/2007 |
| JP | 2008-001967 A | 1/2008 |
| JP | 2008-106869 A | 5/2008 |
| JP | 2008-174821 A | 7/2008 |
| JP | 2008-174822 A | 7/2008 |
| JP | 2008-196033 A | 8/2008 |
| JP | 2008-267402 A | 11/2008 |
| JP | 2008-274353 A | 11/2008 |
| JP | 2009-150415 A | 7/2009 |
| JP | 2009-150507 A | 7/2009 |
| JP | 2009-150508 A | 7/2009 |
| JP | 2009-180327 A | 8/2009 |
| JP | 2009-185943 A | 8/2009 |
| JP | 2009-192071 A | 8/2009 |
| JP | 2009-222076 A | 10/2009 |
| JP | 2010-138933 A | 6/2010 |
| JP | 2010-248568 A | 11/2010 |
| JP | 2011-7286 A | 1/2011 |
| JP | 2011-84812 A | 4/2011 |
| JP | 2011-94784 A | 5/2011 |
| JP | 2011-94785 A | 5/2011 |
| JP | 2011-140992 A | 7/2011 |
| JP | 2011-141023 A | 7/2011 |
| JP | 2011-220357 A | 11/2011 |
| JP | 2012-107675 A | 6/2012 |
| JP | 2013-119930 A | 6/2013 |
| WO | 2007116875 A1 | 10/2007 |
| WO | 2011/122632 A1 | 10/2011 |

OTHER PUBLICATIONS

Mouri et al "Improvement of Carburized Steel Wear Resistance by Haet Treatment" NTN Technical Review No. 76 (2008) p. 18-23.*

(56) References Cited

OTHER PUBLICATIONS

Patent Family from the European Patent Office online services generated on Jun. 25, 2018.*
Chikara Oki, "Evaluation of Scratched Contact Fatigue Life with Artificial Dent of Carbonitrided SUJ2 Steel Whose Surface Nitrogen Content is Controlled", NTN Technical Review, No. 78, NTN Corp., 2010.10, 20 to 28.
Chikara Oki, "Estimation of Nitrogen Concentration Distribution for Carbonitrided SUJ2 Steel", Journal of the Iron & Steel Institute of Japan, vol. 93, No. 3, The Iron and Steel Institute of Japan, Mar. 1, 2007 (Mar. 1, 2007), 220 to 227.
International Search Report dated Aug. 19, 2014, received in related International Application No. PCT/JP2014/064118, filed May 28, 2014 (translation is provided).
English language translation of the Notification of Reasons for Refusal dated Apr. 4, 2017, issued in corresponding Japanese Patent Application No. 2013-120140 (Original reference was previously submitted on Jun. 2, 2017).
Marye: "Steel RAD 100Cr6", May 11, 2010 (May 11, 2010), XP055348300, Retrieved from the Internet <URL:http://www.aubertduval.com/uploads/tx_obladygestionproduit/RAD_GB.pdf>.
Extended European Search Report issued in corresponding European Patent Application No. EP 14 80 7601, dated Oct. 7, 2016.
Extended Search Report issued in corresponding European Patent Application No. 14807505.4, dated Mar. 9, 2017.
Office Action issued in corresponding Chinese Patent Application No. 201480032272.8, dated Dec. 22, 2016.
Office Action issued in corresponding Chinese Patent Application No. 201480032223.4, dated May 4, 2017.
Office Action issued in corresponding Chinese Patent Application No. 201480032216.4, dated Jun. 7, 2017.
Office Action issued in corresponding Japanese Application No. 2013-120137, dated Jan. 7, 2014.
Office Action issued in corresponding Japanese Application No. 2013-120142, dated Jan. 7, 2014.
Office Action issued in cross-related U.S. Appl. No. 14/895,901, dated May 19, 2017.
Office Action issued in cross-related U.S. Appl. No. 14/895,914, dated May 19, 2017.
Office Action issued in cross-related U.S. Appl. No. 14/896,265, dated May 18, 2017.
Ohki, Chikara, "Atmospheric Control Method for JIS-SUJ2 Carbonitriding Processes", NTN Technical Review, No. 74, pp. 44-53 (2006).
Extended European Search Report issued in corresponding European Application No. 14807785.2, dated Oct. 17, 2016.
Notice on the First Office Action dated May 2, 2017, issued in Chinese Patent Application No. 201480032221.5, with English language translation.
Notification of Reasons for Refusal dated Mar. 7, 2017, issued in corresponding Japanese Patent Application No. 2013-120138, with English language translation.
Notification of Reasons for Refusal dated Mar. 7, 2017, issued in corresponding Japanese Patent Application No. 2013-120139, with English language translation.
Notification of Reasons for Refusal dated Apr. 4, 2017, issued in corresponding Japanese Patent Application No. 2013-120140, with English language translation.
Extended European Search Report dated Feb. 20, 2017, issued in corresponding European Patent Application No. 14806819.0.
International Search Report dated Aug. 19, 2014, received in related International Application No. PCT/JP2014/064113, filed May 28, 2014 (translation is provided).
International Search Report dated Aug. 19, 2014, received in related International Application No. PCT/JP2014/064116, filed May 28, 2014 (translation is provided).
International Search Report dated Aug. 19, 2014, received in related International Application No. PCT/JP2014/064117, filed May 28, 2014 (translation is provided).
Office Action received in U.S. Appl. No. 14/895,470 dated May 18, 2017.
Extended European Search Report issued in European Application No. 14807785.2 dated Oct. 17, 2016.
Ohki, Chikara, "Estimation of Nitrogen Concentration Distribution for Carbonitrided SUJ2 Steel", Journal of the Iron and Steel Institute of Japan, vol. 93, No. 3, The Iron and Steel Institute of Japan, Mar. 1, 2007, pp. 20-27.
Chinese Office Action received in Chinese Application No. 201480032272.8 dated Dec. 22, 2016.
International Search Report issued International Application No. PCT/JP2012/081788 dated Mar. 5, 2013 (with English translation).
Information Offer Form related to Japanese Patent Application No. 2011-269037 dated Mar. 30, 2015.
Information Offer Form related to Japanese Patent Application No. 2011-269102 dated Mar. 30, 2015.
Information Offer Form related to Japanese Patent Application No. 2012-178416 dated Mar. 30, 2015.
Notice of Allowance issued in U.S. Appl. No. 14/363,750 dated Aug. 4, 2015.
Japanese Office Action issued in Japanese Patent Application No. 2011-269037 dated Sep. 1, 2015 (with English translation).
European Search Report issued in European Application No. 12855776.6 dated Nov. 30, 2015.
Japanese Office Action issued in Japanese Patent Application No. 2012-164856 dated Feb. 16, 2016 (with English translation).
Japanese Office Action issued in Japanese Patent Application No. 2012-164738 dated Mar. 1, 2016 (with English translation).
Japanese Office Action issued in Japanese Patent Application No. 2012-178416 dated Mar. 1, 2016 (with English translation).
Japanese Office Action issued in Japanese Patent Application No. 2012-164856 dated Jul. 19, 2016 (with English translation).
Japanese Office Action issued in Japanese Patent Application No. 2015-242976 dated Oct. 25, 2016 (with English translation).
Chinese Office Action issued in Chinese Patent Application No. 201510726275.8 dated Nov. 30, 2016 (with English translation).
Japanese Office Action issued in Japanese Patent Application No. 2016-081905 dated Jan. 31, 2017 (with English translation).
Japanese Office Action issued in Japanese Patent Application No. 2016-250792 dated Oct. 17, 2017 (with English translation).
Notice of Grounds of Rejection issued in Japanese Patent Application No. 2016-250792 dated May 15, 2018 (with English translation).
Decision to Grant Patent issued in Japanese Patent Application No. 2017-146865 dated May 22, 2018 (with English tranlsation).

* cited by examiner

AMOUNT OF RETAINED AUSTENITE IN
NON-GROUND PORTION (VOLUME %)

BEARING COMPONENT AND ROLLING BEARING

CROSS-REFERENCE

This application is the U.S. National Phase under 35 U.S.C. § 371 of International Application No. PCT/JP2014/064118, filed May 28, 2014, which claims the benefit of Japanese Application Nos. 2013-120138, filed Jun. 6, 2013, 2013-120139, filed Jun. 6, 2013, and 2013-120140, filed Jun. 6, 2013, the entire contents of each are hereby incorporated by reference.

TECHNICAL FIELD

The present invention relates to a bearing component and a rolling bearing and more particularly to a bearing component which has improved durability and to a rolling bearing including the bearing component.

BACKGROUND ART

Carbonitriding treatment has been known as measures for improving durability of a bearing component included in a rolling bearing (see, for example, PTD 1 (Japanese Patent Laying-Open No. 2007-277648) and PTD 2 (Japanese Patent Laying-Open No. 2008-267402)). The carbonitriding treatment is heat treatment in which steel is heated to a temperature not lower than an $A_1$ transformation point for diffusion and penetration of carbon and nitrogen into steel and thereafter is quenched. The carbonitriding treatment is effective for extending scratched contact life which is important performance of the rolling bearing.

CITATION LIST

Patent Document

PTD 1: Japanese Patent Laying-Open No. 2007-277648
PTD 2: Japanese Patent Laying-Open No. 2008-267402

SUMMARY OF INVENTION

Technical Problem

In consideration of demands for improvement in durability in bearing components in recent years, depending on applications, it may be difficult to provide sufficient durability through conventional carbonitriding treatment.

The present invention was made in view of the problems above, and an object thereof is to provide a bearing component which has improved durability and a rolling bearing including the bearing component.

Solution to Problem

A bearing component according to the present invention is composed of steel which contains carbon not less than 0.95 mass % and not more than 1.1 mass %, silicon less than 0.3 mass %, manganese less than 0.5 mass %, sulfur less than 0.008 mass %, and chromium not less than 1.4 mass % and less than 1.6 mass % and is composed of remainder iron and an impurity and has a carbonitrided layer formed at a surface portion including a contact surface which is a surface in contact with other components. In the bearing component, an average concentration of nitrogen in the surface portion is not lower than 0.3 mass % and not higher than 0.6 mass % and variation in nitrogen concentration in the surface portion is not higher than 0.1 mass %. In the bearing component, an area ratio of a precipitate in a region where no carbonitrided layer is formed is not higher than 7%.

The present inventor has conducted dedicated studies about measures for improving durability of a bearing component included in a rolling bearing or the like. Consequently, the present inventor has obtained the finding below and derived the present invention.

In a bearing component, such a damage as a crack is likely to occur at a contact surface (for example, a raceway surface of a rolling bearing ring, or a rolling contact surface of a ball and a roller) which is in contact with other components and a portion directly under the contact surface. In order to address this, durability of the bearing component can be improved by subjecting the contact surface to carbonitriding treatment.

According to the studies conducted by the present inventor, when a nitrogen concentration in the surface portion including the contact surface is lower than 0.2 mass %, scratched contact life of the bearing component is shorter. Therefore, in order to suppress shorter life of the bearing component, the nitrogen concentration in the surface portion should be not lower than 0.2 mass %. When a nitrogen concentration in the surface portion exceeds 0.7 mass %, an amount of retained austenite is excessive and hence a hardness of the contact surface lowers. Therefore, in order to suppress lowering in hardness of the contact surface, a nitrogen concentration in the surface portion should be not higher than 0.7 mass %.

The bearing component is manufactured by subjecting a formed steel product to heat treatment such as carbonitriding treatment or tempering treatment and thereafter subjecting the contact surface to finishing. The steel product may deform owing to the heat treatment (for example, a rolling bearing ring may be in an oval shape and a circularity may become poor) and grinding allowance during finishing may vary. Therefore, in a conventional bearing component, variation in nitrogen concentration in the surface portion has disadvantageously been great.

Steel forming the bearing component can be solid-solution strengthened by dissolving a precipitate such as a carbide therein. Here, since an area ratio of a carbide in yet-to-be-quenched steel is constant, an amount of solid solution of carbon into steel can be estimated based on an area ratio of a carbide in the inside after carbonitriding treatment. According to the studies conducted by the present inventor, by setting an area ratio of a precipitate in a region where no carbonitrided layer is formed (unnitrided region) to 7% or lower, an amount of solid solution of carbon in the inside increases and consequently life is improved. Such an area ratio of the precipitate can be achieved by increasing a temperature in carbonitriding treatment.

In contrast, in the bearing component according to the present invention, an average concentration of nitrogen in the surface portion is not lower than 0.3 mass % and not higher than 0.6 mass % and variation in nitrogen concentration in the surface portion is lessened to 0.1 mass % or lower. Therefore, in the bearing component, a nitrogen concentration in the surface portion is not lower than 0.2 mass % and not higher than 0.7 mass %, and shorter scratched contact life and lowering in hardness of the contact surface are suppressed. In the bearing component, since an area ratio of a precipitate in a region where no carbonitrided layer is formed is 7% or lower, life is further improved. Therefore, according to the bearing component in the present invention, a bearing component having improved durability can more reliably be provided.

In the bearing component according to the present invention, the "surface portion" means a region extending from the contact surface to a depth of 20 μm in a direction of thickness of the bearing component. The "average concentration of nitrogen in the surface portion" and "variation in nitrogen concentration in the surface portion" are as defined in an embodiment of the present invention which will be described later.

Reasons why a composition of components in steel forming the bearing component according to the present invention is set to the range above will now be described.

Carbon: not less than 0.95 mass % and not more than 1.1 mass %

A content of carbon significantly affects a hardness and an amount of carbide of a bearing component after quench-hardening. When a content of carbon in steel is not less than 0.95 mass %, sufficient hardness and amount of carbide can be achieved without introducing much carbon into steel through heat treatment. When a content of carbon exceeds 1.1 mass %, large carbide is formed at the time point of manufacturing of steel, and the carbide may adversely affect durability of the bearing component. Therefore, the content of carbon is not less than 0.95 mass % and not more than 1.1 mass %.

Silicon: less than 0.3 mass %

Silicon increases an amount of occlusion of hydrogen in steel and accelerates hydrogen embrittlement. When a content of silicon in steel is 0.3 mass % or higher, flaking due to hydrogen embrittlement tends to occur in applications in which hydrogen readily penetrates into steel. Therefore, in the bearing component, a content of silicon in steel is less than 0.3 mass %.

Manganese: less than 0.5 mass %

Manganese contributes to hardenability of steel and a hardness of yet-to-be quenched steel. When a content of manganese is not lower than 0.5 mass %, however, a hardness of a yet-to-be quenched material is high and workability in a cold process lowers. Therefore, the content of manganese is lower than 0.5 mass %.

Sulfur: less than 0.008 mass %

Sulfur is chemically bonded to manganese or the like and forms a non-metallic inclusion such as manganese sulfide. This non-metallic inclusion can adversely affect life of a bearing. Therefore, in the bearing component, a content of sulfur in steel is less than 0.008 mass %.

Chromium: not less than 1.4 mass % and less than 1.6 mass %

Chromium contributes to improvement in hardenability of steel. Since a content of silicon is low in order to prevent flaking due to hydrogen embrittlement in the bearing component according to the present invention, hardenability has been lowered. Then, in order to compensate for lowering in hardenability due to decrease in content of silicon, in the bearing component, a content of chromium in steel is not less than 1.4 mass % and less than 1.6 mass %.

In the bearing component, a hardness in the contact surface may be not lower than 700 HV. The hardness in the contact surface is maintained at 700 HV or higher. Therefore, according to the bearing component in the present invention, a bearing component having improved durability can more reliably be provided.

In the bearing component, crystal grains of prior austenite may have a grain size number not smaller than No. 9 and not greater than No. 11 defined under JIS. As a steel structure is made finer until crystal grains of prior austenite have a grain size number not smaller than No. 9 and not greater than No. 11 defined under JIS, durability is further improved. Therefore, according to the bearing component in the present invention, a bearing component having improved durability can more reliably be provided.

In the bearing component, an inclination of a nitrogen concentration in a direction of thickness of the bearing component may be not less than −15 (1/m). An inclination of the nitrogen concentration is determined as described in Examples which will be described later. Thus, variation in nitrogen concentration in the surface portion after the contact surface is finished can readily be lessened.

The "inclination of the nitrogen concentration" may be an inclination of a nitrogen concentration before the contact surface is subjected to finishing such as grinding treatment, or an inclination of a nitrogen concentration after the contact surface is finished (a state as a product). Namely, in the bearing component, an inclination of the nitrogen concentration may be not less than −15 (1/m) before the contact surface is finished, an inclination of the nitrogen concentration may be not less than −15 (1/m) after finishing, or an inclination of the nitrogen concentration may be not less than −15 (1/m) before and after finishing.

In the bearing component, an average amount of retained austenite at a position at a depth of 0.05 mm from the contact surface may be not lower than 25 volume % and not higher than 35 volume %, and variation in amount of retained austenite at the position at the depth of 0.05 mm from the contact surface may be not higher than 3 volume %.

According to the studies conducted by the present inventor, when an amount of retained austenite at a position at a depth of 0.05 mm from the contact surface is not lower than 22 volume %, life is significantly improved. When an amount of retained austenite at the depth position above exceeds 38 volume %, a hardness of the contact surface lowers. Therefore, shorter life and lowering in hardness of the contact surface can further be suppressed by setting an average amount of retained austenite at the depth position above to be not lower than 25 volume % and not higher than 35 volume %, setting variation in amount of retained austenite at the depth position above to be not higher than 3 volume %, and thus setting an amount of retained austenite at the depth position above to be not lower than 22 volume % and not higher than 38 volume %. The "average amount of retained austenite at the depth position above" and "variation in amount of retained austenite at the depth position above" are as defined in an embodiment of the present invention which will be described later.

In the bearing component, an average amount of retained austenite as a whole may be not higher than 18 volume %.

According to the studies conducted by the present inventor, when an average amount of retained austenite in the bearing component as a whole is not higher than 18 volume %, long-term dimensional variation is lessened. Therefore, by setting an average amount of retained austenite as a whole to 18 volume % or lower, dimension accuracy of the bearing component can be improved.

In the bearing component, the surface portion may include five or more carbonitrides per 100 $\mu m^2$, the carbonitride having a diameter not greater than 0.5 μm.

According to the studies conducted by the present inventor, when the surface portion includes five or more carbonitrides per 100 $\mu m^2$, the carbonitride having a diameter not greater than 0.5 μm, a static load capacity of the bearing component improves owing to precipitation strengthening of the carbonitride. Therefore, by defining an amount of existence of the carbonitride in the surface portion to the range above, a static load capacity of the bearing component can further be improved. In this case, a concentration of carbon in the surface portion is not lower than 0.9 mass % and not higher than 1.1 mass %.

Here, the "surface portion having five or more carbonitrides per 100 $\mu m^2$, the carbonitride having a diameter not greater than 0.5 $\mu m$" means that, when the surface portion of a cross-section obtained by cutting the bearing component along a cross-section perpendicular to the contact surface is observed with a microscope, five or more carbonitrides having a diameter not greater than 0.5 $\mu m$ are observed per 100 $\mu m^2$. The "carbonitride" is such a substance that a carbide of iron or a part of carbon in the carbide has been substituted with nitrogen and includes an Fe—C based compound and an Fe—C—N based compound. This carbonitride may contain an alloy element contained in steel, such as chromium.

In the bearing component, the nitrogen concentration in a non-ground portion including a non-ground surface which is a surface other than the contact surface may be lower than 0.7 mass %.

According to the studies conducted by the present inventor, when a nitrogen concentration in the non-ground portion is not lower than 0.7 mass %, an amount of retained austenite is excessive and consequently a hardness of the non-ground surface lowers. Therefore, in order to ensure a sufficient hardness at the non-ground surface, a nitrogen concentration in the non-ground portion is preferably lower than 0.7 mass %. The "non-ground portion" means a region extending from a non-ground surface to a depth of 20 $\mu m$ in a direction of thickness of the bearing component. In this case, a hardness at a position at a depth of 0.1 mm from the non-ground surface is not lower than 700 HV.

In the bearing component, after heat treatment in which a heating temperature is set to 500° C. and a retention time period is set to 1 hour, a Vickers hardness at a position at a depth of 0.4 (mm) from the contact surface may be higher by at least 80 HV than a Vickers hardness in a region where no carbonitrided layer is formed in a direction of thickness of the bearing component.

Thus, a nitrogen concentration in the contact surface not lower than 0.4 mass % can be ensured.

A rolling bearing according to the present invention includes the bearing component according to the present invention which has improved durability. Therefore, according to the rolling bearing in the present invention, a rolling bearing having improved durability can be provided.

Advantageous Effects of Invention

As is clear from the description above, according to the bearing component and the rolling bearing in the present invention, a bearing component and a rolling bearing having improved durability can be provided.

DESCRIPTION OF EMBODIMENTS

Figure 1:
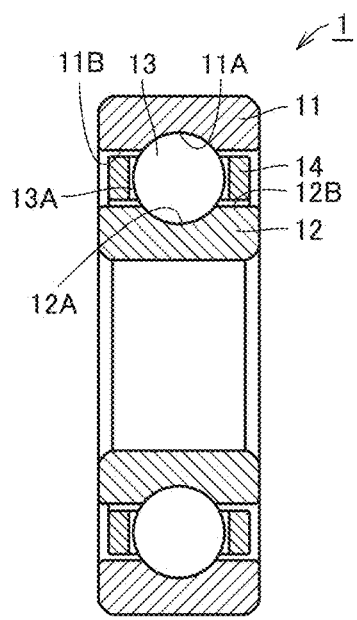
FIG. 1 is a schematic cross-sectional view showing a structure of a deep-groove ball bearing according to the present embodiment.

An embodiment of the present invention will be described hereinafter with reference to the drawings. In the drawings below, the same or corresponding elements have the same reference characters allotted and description thereof will not be repeated.

A structure of a deep-groove ball bearing 1 as a rolling bearing according to the present embodiment will initially be described with reference to FIG. 1. Deep-groove ball bearing 1 includes an annular outer ring 11, an annular inner ring 12 arranged on an inner side of outer ring 11, and a plurality of balls 13 which are arranged between outer ring 11 and inner ring 12 and serve as rolling elements each held by an annular cage 14. An outer ring raceway surface 11A is formed on an inner circumferential surface of outer ring 11, and an inner ring raceway surface 12A is formed on an outer circumferential surface of inner ring 12. Inner ring 12 is arranged on the inner side of outer ring 11 such that inner ring raceway surface 12A is opposed to outer ring raceway surface 11A. The plurality of balls 13 are in contact with outer ring raceway surface 11A and inner ring raceway surface 12A at a rolling contact surface 13A, and arranged at a prescribed pitch in a circumferential direction by means of cage 14. Thus, the plurality of balls 13 are held on an annular raceway of outer ring 11 and inner ring 12 in a freely rolling manner. According to such a construction, outer ring 11 and inner ring 12 of deep-groove ball bearing 1 can rotate relatively to each other. Outer ring 11, inner ring 12, and balls 13 represent bearing components according to the present embodiment which will be described later.

Figure 2:
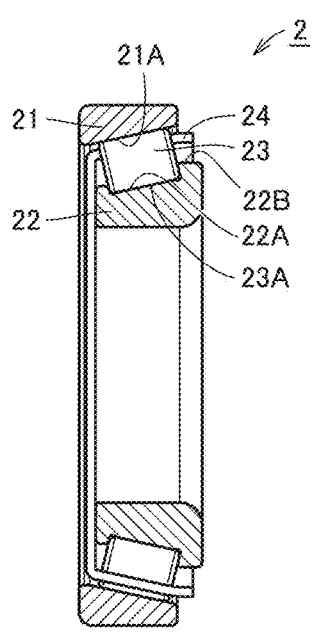
FIG. 2 is a schematic cross-sectional view showing a structure of a tapered roller bearing according to the present embodiment.

A structure of a tapered roller bearing 2 representing another rolling bearing according to the present embodiment will now be described with reference to FIG. 2. Tapered roller bearing 2 includes an annular outer ring 21, an annular inner ring 22, a plurality of rollers 23 representing rolling elements, and an annular cage 24. An outer ring raceway surface 21A is formed on an inner circumferential surface of outer ring 21, and an inner ring raceway surface 22A is formed on an outer circumferential surface of inner ring 22. Inner ring 22 is arranged on the inner side of outer ring 21 such that inner ring raceway surface 22A is opposed to outer ring raceway surface 21A.

Rollers 23 are in contact with outer ring raceway surface 21A and inner ring raceway surface 22A at a rolling contact surface 23A, and arranged at a prescribed pitch in a circumferential direction by means of cage 24. Thus, rollers 23 are held on an annular raceway of outer ring 21 and inner ring 22 in a freely rolling manner. Tapered roller bearing 2 is constructed such that vertices of a cone including outer ring raceway surface 21A, a cone including inner ring raceway surface 22A, and a cone including a trace of a rotation axis during rolling of rollers 23 intersect with one another at one point on a centerline of a bearing. According to such a construction, outer ring 21 and inner ring 22 of tapered roller bearing 2 can rotate relatively to each other. Outer ring 21, inner ring 22, and rollers 23 represent bearing components according to the present embodiment, similarly to outer ring 11, inner ring 12, and balls 13.

A structure of the bearing component (outer ring 11, 21, inner ring 12, 22, balls 13, and rollers 23) according to the present embodiment will now be described. The bearing component is composed of steel containing carbon not less than 0.95 mass % and not more than 1.1 mass %, silicon less than 0.3 mass %, manganese less than 0.5 mass %, sulfur less than 0.008 mass %, and chromium not less than 1.4 mass % and less than 1.6 mass % and composed of remainder iron and an impurity. The bearing component has a contact surface (outer ring raceway surface 11A, 21A, inner ring raceway surface 12A, 22A, and rolling contact surface 13A, 23A) in contact with other components and a carbonitrided layer is formed in a surface portion including the contact surface.

In the bearing component, an average concentration of nitrogen in the surface portion is not lower than 0.3 mass % and not higher than 0.6 mass % and variation in nitrogen concentration in the surface portion is not higher than 0.1 mass %. Thus, in the bearing component, scratched contact life is improved and lowering in hardness of the contact surface is suppressed. More specifically, a hardness of the contact surface is maintained at 700 HV or higher. In the bearing component, since a steel structure is made finer until crystal grains of prior austenite have a grain size number not smaller than No. 9 and not greater than No. 11 defined under JIS, durability is further improved. Therefore, deep-groove ball bearing 1 and tapered roller bearing 2 including the bearing component achieve improved durability.

In the bearing component, an area ratio of a precipitate in a region where no carbonitrided layer is formed (a base material) is not higher than 7% and preferably 5%. The precipitate refers to a carbonitride resulting from substitution of a carbide of iron or a part of carbon in the carbide with nitrogen, and includes an Fe—C based compound and an Fe—C—N based compound. This carbonitride may contain an alloy component contained in steel, such as chromium. By thus lowering an area ratio of a precipitate and increasing an amount of solid solution of carbon into the base material, life of the bearing component can further be improved.

In the bearing component, the "average concentration of nitrogen in the surface portion" and "variation in nitrogen concentration in the surface portion" are measured as follows. Here, measurement in connection with inner ring 12, 22 will be described by way of example.

Figure 3:
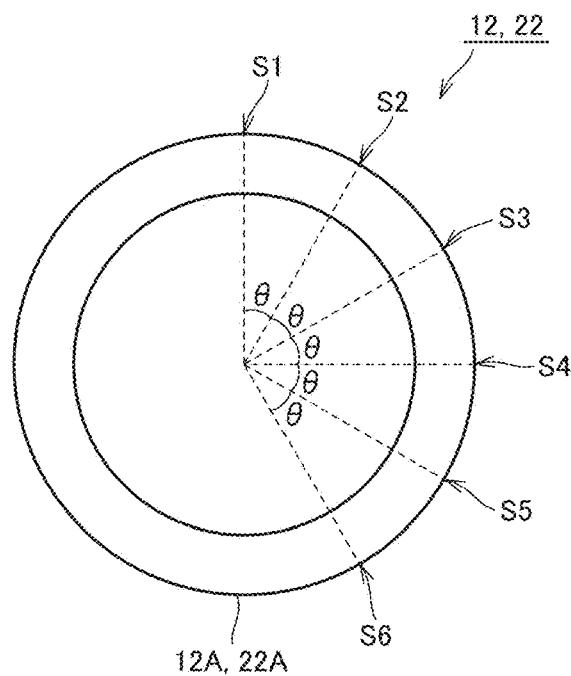
FIG. 3 is a schematic diagram for illustrating a method of measuring a nitrogen concentration in a bearing component according to the present embodiment.

Referring to FIG. 3, initially, a measurement point S1 is set at any location on the contact surface of inner ring 12, 22 (inner ring raceway surface 12A, 22A). Then, a measurement point S2 displaced by θ (30°) in a circumferential direction from measurement point S1, a measurement point S3 displaced by θ (30°) in the circumferential direction from measurement point S2, a measurement point S4 displaced by θ (30°) in the circumferential direction from measurement point S3, a measurement point S5 displaced by θ (30°) in the circumferential direction from measurement point S4, and a measurement point S6 displaced by θ (30°) in the circumferential direction from measurement point S5 are set. A plurality of measurement points S1 to S6 displaced along the circumferential direction on the contact surface of inner ring 12, 22 by 30° each are thus set. Measurement points S1 to S6 are set in an axially central portion on the contact surface of inner ring 12, 22.

The rolling bearing ring such as inner ring 12, 22 may deform into an oval shape through heat treatment and a circularity may become poor, which may lead to variation in nitrogen concentration in the surface portion after grinding. In contrast, when measurement points S1 to S6 displaced along the circumferential direction by 30° each are set, the measurement points are arranged as being distributed over a region covering substantially half in the circumferential direction and hence a maximum value and a minimum value for the nitrogen concentration can substantially be included among measurement points S1 to S6. Therefore, the "average concentration of nitrogen in the surface portion" and "variation in nitrogen concentration in the surface portion" can more accurately be evaluated by making evaluation based on measurement values at measurement points S1 to S6.

Figure 4:
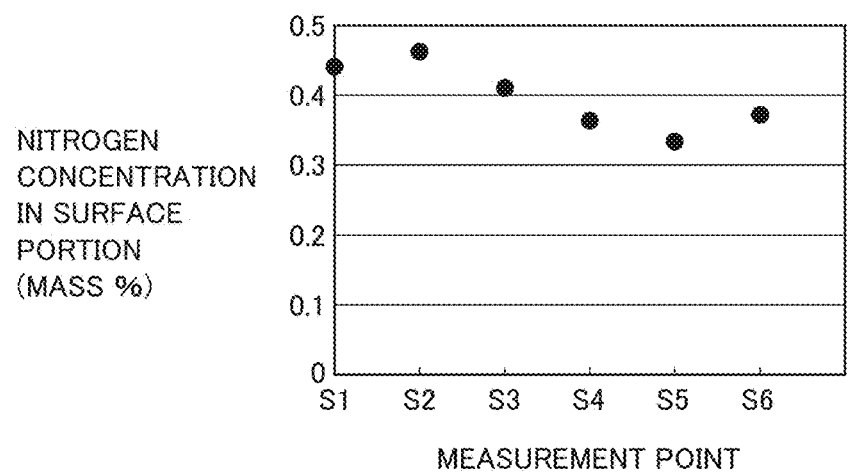
FIG. 4 is a graph showing a result of measurement of a nitrogen concentration in the bearing component according to the present embodiment.

FIG. 4 shows a nitrogen concentration in the surface portion (ordinate) measured at measurement points S1 to S6 (abscissa). An average value of nitrogen concentrations shown on the ordinate in FIG. 4 can be defined as the "average concentration of nitrogen in the surface portion." A largest value of differences between the "average concentration of nitrogen in the surface portion" and measurement values at measurement points S1 to S6 can be defined as "variation in nitrogen concentration in the surface portion."

In the bearing component (outer ring 11, 21, inner ring 12, 22, balls 13, and rollers 23), an inclination of a nitrogen concentration in the direction of thickness before the contact surface (outer ring raceway surface 11A, 21A, inner ring raceway surface 12A, 22A, and rolling contact surface 13A, 23A) is finished may be not less than −15 (1/m). Thus, variation in nitrogen concentration in the surface portion can be lessened to 0.1 mass % or lower after the contact surface is finished. In the bearing component, an inclination of a nitrogen concentration in the direction of thickness may be not less than −15 (1/m) also after the contact surface is finished.

In the bearing component (outer ring 11, 21, inner ring 12, 22, balls 13, and rollers 23), an average amount of retained austenite at a position at a depth of 0.05 mm from the contact surface (outer ring raceway surface 11A, 21A, inner ring raceway surface 12A, 22A, and rolling contact surface 13A, 23A) may be not lower than 25 volume % and not higher than 35 volume %, and variation in amount of retained austenite at the depth position above may be not higher than 3 volume %. Thus, shorter scratched contact life and lowering in hardness of the contact surface can further be suppressed. The "average amount of retained austenite at the depth position above" and "variation in amount of retained austenite at the depth position above" can be measured as in the case of the "average concentration of nitrogen in the surface portion" and "variation in nitrogen concentration in the surface portion" described with reference to FIGS. 3 and 4.

In the bearing component (outer ring 11, 21, inner ring 12, 22, balls 13, and rollers 23), an average amount of retained austenite in the bearing component as a whole may be not higher than 18 volume %. Since long-term dimensional variation is thus lessened, dimension accuracy of the bearing component can be improved.

In the bearing component (outer ring 11, 21, inner ring 12, 22, balls 13, and rollers 23), the surface portion may include five or more carbonitrides per 100 μm², the carbonitride having a diameter not greater than 0.5 μm. Thus, a static load capacity of the bearing component can further be improved.

In the bearing component (outer ring 11, 21, inner ring 12, 22, balls 13, and rollers 23), a nitrogen concentration in the non-ground portion including non-ground surfaces 11B, 12B, and 22B which are surfaces other than the contact surface (outer ring raceway surface 11A, 21A, inner ring raceway surface 12A, 22A, and rolling contact surface 13A, 23A) may be lower than 0.7 mass %. Thus, a sufficient hardness (not lower than 700 HV) in non-ground surfaces 11B, 12B, and 22B can be ensured.

In the bearing component (outer ring 11, 21, inner ring 12, 22, balls 13, and rollers 23), after heat treatment in which a heating temperature is set to 500° C. and a retention time period is set to 1 hour, a Vickers hardness at a position at a depth of 0.4 (mm) from the contact surface (outer ring raceway surface 11A, 21A, inner ring raceway surface 12A, 22A, and rolling contact surface 13A, 23A) may be higher by at least 80 HV than a Vickers hardness in a region where no carbonitrided layer is formed in the direction of thickness of the bearing component. Thus, it can be ensured that a nitrogen concentration in the contact surface is not lower than 0.4 mass %.

A method of manufacturing a bearing component according to the present embodiment will now be described. In the method of manufacturing a bearing component according to the present embodiment, the bearing component (outer ring 11, 21, inner ring 12, 22, balls 13, and rollers 23) according to the present embodiment can be manufactured.

Figure 5:
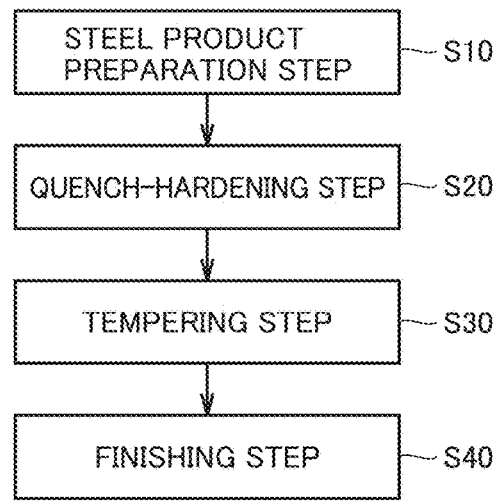
FIG. 5 is a flowchart for illustrating a method of manufacturing a bearing component according to the present embodiment.

Referring to FIG. 5, initially, in a step (S10), a steel product preparation step is performed. In this step (S10), initially, a steel product containing carbon not less than 0.95 mass % and not more than 1.1 mass %, silicon less than 0.3 mass %, manganese less than 0.5 mass %, sulfur less than 0.008 mass %, and chromium not less than 1.4 mass % and less than 1.6 mass % and composed of remainder iron and an impurity is prepared. Then, the steel product is formed in an approximate shape of the bearing component. For example, bar steel or a steel wire is employed as a source material, the bar steel or the steel wire is cut, forged, or turned, and thus a steel product formed into an approximate shape of outer ring 11, 21, inner ring 12, 22, or balls 13 and rollers 23 representing the bearing component is prepared.

Then, in a step (S20), a quench-hardening step is performed. In this step (S20), the steel product prepared in the step (S10) is successively subjected to carbonitriding treatment and nitrogen diffusion treatment, and thereafter the steel product is cooled to a temperature not higher than an $M_s$ point (martensite transformation starting point). This step (S20) will be described in detail later.

Then, in a step (S30), a tempering step is performed. In this step (S30), the steel product quench-hardened in the step (S20) is subjected to heat treatment at a temperature not higher than the $A_1$ point. More specifically, after the step (S20) is completed, the steel product is held for a prescribed period of time at a temperature not lower than 180° C. and not higher than 220° C., which is not higher than the $A_1$ point (for example, 210° C.), so that the steel product is tempered. Thereafter, the steel product is cooled by air at a room temperature (air cooling). Toughness of the steel product can thus be improved.

Then, in a step (S40), a finishing step is performed. In this step (S40), the contact surface (outer ring raceway surface 11A, 21A, inner ring raceway surface 12A, 22A, and rolling contact surface 13A, 23A) which has been tempered is ground. Thus, outer ring 11, 21, inner ring 12, 22, balls 13, and rollers 23 (see FIGS. 1 and 2) representing the bearing component according to the present embodiment are manufactured and the method of manufacturing a bearing component according to the present embodiment is completed. Then, deep-groove ball bearing 1 (see FIG. 1) is manufactured by combining manufactured outer ring 11, inner ring 12, and balls 13 with one another and tapered roller bearing 2 (see FIG. 2) is manufactured by combining outer ring 21, inner ring 22, and rollers 23 with one another.

Figure 6:
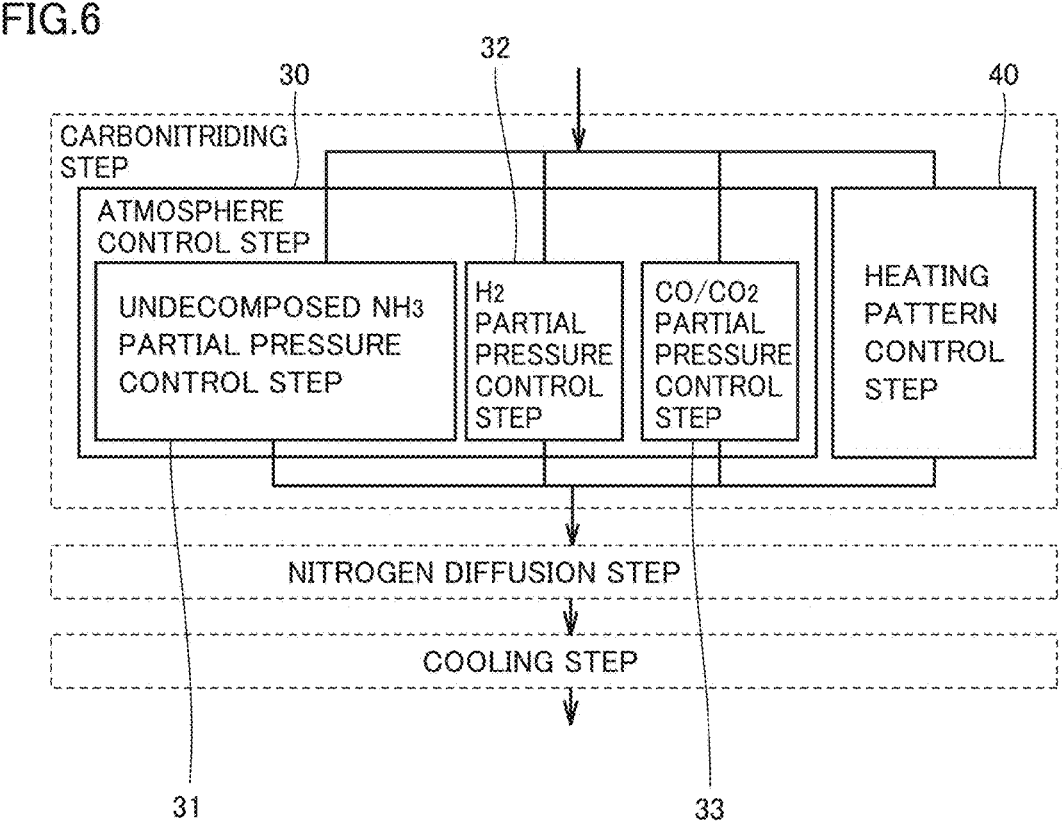
FIG. 6 is a schematic diagram for illustrating details of a quench-hardening step (S20) in the method of manufacturing a bearing component according to the present embodiment.
Figure 7:
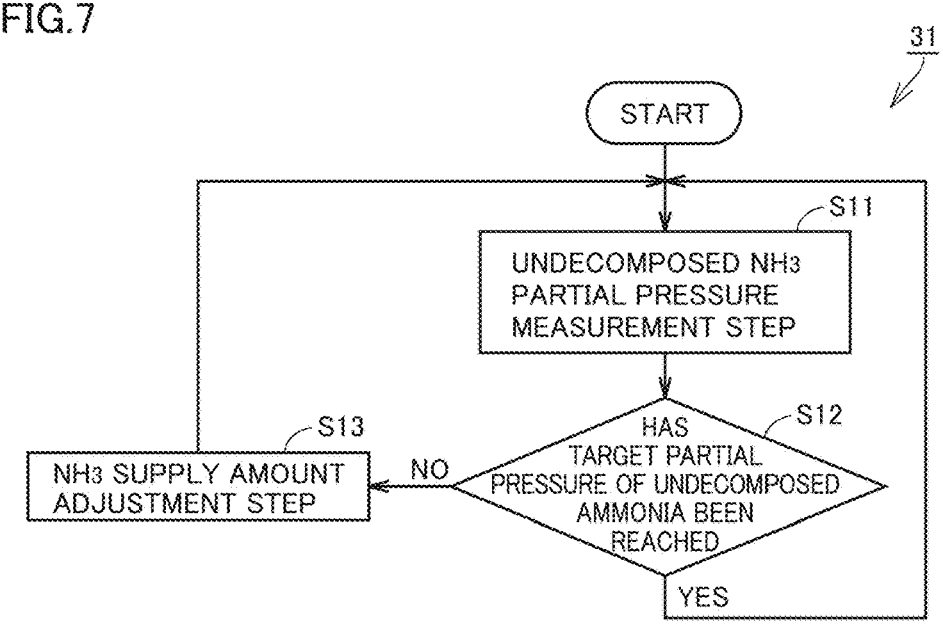
FIG. 7 is a schematic diagram for illustrating an undecomposed $NH_3$ partial pressure control step included in an atmosphere control step in FIG. 6.
Figure 8:
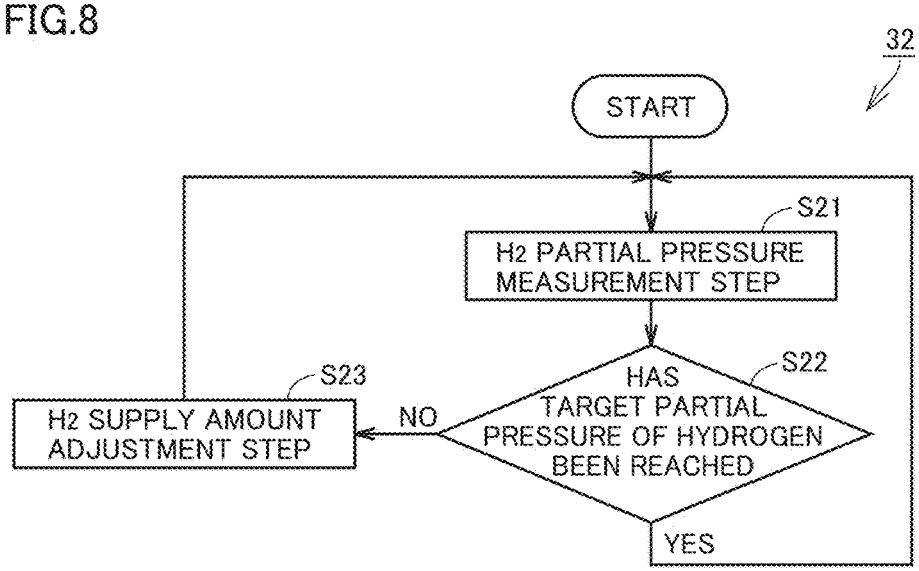
FIG. 8 is a diagram for illustrating an $H_2$ partial pressure control step included in the atmosphere control step in FIG. 6.
Figure 9:
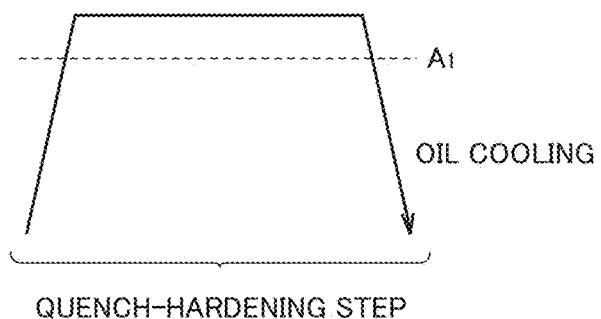
FIG. 9 is a diagram showing one example of a heating pattern in a heating pattern control step included in a carbonitriding step in FIG. 6.

The quench-hardening step (S20) will now be described in detail with reference to FIGS. 6 to 9. FIG. 6 is a diagram for illustrating in detail the quench-hardening step (S20). FIG. 7 is a diagram for illustrating an undecomposed ammonia (NH₃) partial pressure control step included in an atmosphere control step in FIG. 6. FIG. 8 is a diagram for illustrating a hydrogen (H$_2$) partial pressure control step included in the atmosphere control step in FIG. 6. FIG. 9 is a diagram showing one example of a heating pattern (a temperature history) in a heating pattern control step included in a carbonitriding step in FIG. 6. In FIG. 9, a lateral direction represents time and the direction to the right indicates lapse of time.

Referring to FIG. 6, in the quench-hardening step (S20), initially, the carbonitriding step in which the steel product prepared in the step (S10) is carbonitrided is performed. Then, a nitrogen diffusion step for diffusing nitrogen which has penetrated into steel in the carbonitriding step is performed. Then, after the nitrogen diffusion step is completed, a cooling step in which the steel product is cooled to a temperature not higher than the M$_s$ point is performed. In the carbonitriding step, the steel product is heated in an atmosphere containing ammonia, carbon monoxide, carbon dioxide, and hydrogen.

The carbonitriding step includes an atmosphere control step 30 of controlling an atmosphere in a heat treatment furnace and a heating pattern control step 40 of controlling a temperature history provided to the steel product which is an object to be treated in the heat treatment furnace. Atmosphere control step 30 and heating pattern control step 40 can be performed independently and in parallel. Atmosphere control step 30 includes an undecomposed NH$_3$ partial pressure control step 31 of controlling a partial pressure of undecomposed ammonia in the heat treatment furnace, an H$_2$ partial pressure control step 32 of controlling a partial pressure of hydrogen in the heat treatment furnace, and a CO/CO$_2$ partial pressure control step 33 of controlling a partial pressure of at least any one of carbon monoxide and carbon dioxide in the heat treatment furnace.

In CO/CO$_2$ partial pressure control step 33, referring to an expression (1) below, a partial pressure of at least any one of carbon monoxide and carbon dioxide in the heat treatment furnace is controlled so that a carbon activity (a$_c$*) is controlled.

$$a_c^* = \frac{(P_{CO})^2}{K \times P_{CO_2}} \quad (1)$$

Pco: partial pressure (atm) of carbon monoxide, Pco$_2$: partial pressure (atm) of carbon dioxide K: equilibrium constant in <C>+CO$_2$⇔2CO Then, in atmosphere control step 30, undecomposed NH$_3$ partial pressure control step 31, H$_2$ partial pressure control step 32, and CO/CO$_2$ partial pressure control step 33 are performed such that a$_c$* defined in the expression (1) is not smaller than 0.88 and not greater than 1.27 (preferably not smaller than 0.9 and not more than 1.1) and a value for α expressed in an expression (2) below is not smaller than 0.012 and not greater than 0.020 (preferably not smaller than 0.013 and not greater than 0.018). In the expression (2), P$_N$ (atm) represents a partial pressure of undecomposed ammonia and P$_H$ (atm) represents a partial pressure of hydrogen.

$$\alpha = \frac{P_N}{0.006 \times (P_H)^{\frac{3}{2}}} \times \frac{(1.877 - 1.055 \times a_c^*)}{100} \quad (2)$$

Specifically, referring to FIG. 7, in undecomposed NH$_3$ partial pressure control step 31, initially, an undecomposed NH$_3$ partial pressure measurement step (S11) of measuring a partial pressure of undecomposed ammonia in the heat treatment furnace is performed. A partial pressure of undecomposed ammonia can be measured, for example, with a gas chromatograph or an infrared analyzer. Then, an undecomposed NH$_3$ partial pressure determination step (S12) of determining whether or not to perform an NH$_3$ supply amount adjustment step (S13) of increasing or decreasing an amount of supply of an ammonia gas into the heat treatment furnace based on the partial pressure of undecomposed ammonia measured in the step (S11) is performed. Determination is made by comparing a target partial pressure of undecomposed ammonia determined in advance such that a value for α is within a range not smaller than 0.012 and not greater than 0.020 and a measured partial pressure of undecomposed ammonia with each other and determining whether or not a measured partial pressure of undecomposed ammonia has attained to the target partial pressure of undecomposed ammonia.

When the partial pressure of undecomposed ammonia has not attained to the target partial pressure of undecomposed ammonia, the step (S13) of increasing or decreasing the partial pressure of undecomposed ammonia in the heat treatment furnace is performed and thereafter the step (S11) is performed again. The step (S13) can be performed, for example, by adjusting an amount of ammonia (a flow rate of an ammonia gas) which flows from a canister of the ammonia gas coupled through a pipe to the heat treatment furnace into the heat treatment furnace in a unit time by using a flow rate control device including a mass flow controller attached to the pipe. Namely, the step (S13) can be performed by lowering the flow rate when the measured partial pressure of undecomposed ammonia is higher than the target partial pressure of undecomposed ammonia and increasing the flow rate when the measured partial pressure of undecomposed ammonia is lower than the target partial pressure of undecomposed ammonia. In this step (S13), when there is a prescribed difference between the measured partial pressure of undecomposed ammonia and the target partial pressure of undecomposed ammonia, how much the flow rate is to be increased or decreased can be determined based on relation between increase and decrease in flow rate of the ammonia gas and increase and decrease in partial pressure of undecomposed ammonia experimentally determined in advance.

When the partial pressure of undecomposed ammonia has attained to the target partial pressure of undecomposed ammonia, the step (S11) is again performed without performing the step (S13).

H$_2$ partial pressure control step 32 is performed similarly to undecomposed NH$_3$ partial pressure control step 31 described above. Namely, referring to FIG. 8, in H$_2$ partial pressure control step 32, initially, an H$_2$ partial pressure measurement step (S21) of measuring a partial pressure of hydrogen in the heat treatment furnace is performed. A partial pressure of hydrogen can be measured, for example, with a thermal conductivity gas analyzer. Then, a hydrogen partial pressure determination step (S22) of determining whether or not to perform an H$_2$ supply amount adjustment step (S23) of increasing or decreasing an amount of supply of a hydrogen gas into the heat treatment furnace based on the partial pressure of hydrogen measured in the step (S21) is performed. Determination is made by comparing a target partial pressure of hydrogen determined in advance such that a value for α is within the range not smaller than 0.012 and not greater than 0.020 and a measured partial pressure of hydrogen with each other and determining whether or not the measured partial pressure of hydrogen has attained to the target partial pressure of hydrogen.

When the partial pressure of hydrogen has not attained to the target partial pressure of hydrogen, the step (S23) for increasing or decreasing a partial pressure of hydrogen in the heat treatment furnace is performed, and thereafter the step (S21) is performed again. The step (S23) can be performed, for example, by adjusting an amount of hydrogen (a flow rate of a hydrogen gas) which flows from a canister of the hydrogen gas coupled through a pipe to the heat treatment furnace into the heat treatment furnace in a unit time by using a flow rate control device including a mass flow controller attached to the pipe. Namely, the step (S23) can be performed by lowering the flow rate when the measured partial pressure of hydrogen is higher than the target partial pressure of hydrogen and increasing the flow rate when the measured partial pressure of hydrogen is lower than the target partial pressure of hydrogen. When there is a prescribed difference between the measured partial pressure of hydrogen and the partial pressure of hydrogen in this step (S23), how much the flow rate is to be increased or decreased can be determined based on relation between increase and decrease in flow rate of the hydrogen gas and increase and decrease in partial pressure of hydrogen experimentally determined in advance, as in a case of ammonia.

When the partial pressure of hydrogen has attained to the target partial pressure of hydrogen, the step (S21) is performed again without performing the step (S23).

Referring to FIG. 6, in $CO/CO_2$ partial pressure control step 33, an amount of supply of a propane ($C_3H_8$) gas or a butane gas ($C_4H_{10}$) as an enrichment gas is adjusted so that a partial pressure of at least any one of CO and $CO_2$ is adjusted and $a_c^*$ is adjusted. Specifically, a partial pressure of carbon monoxide $P_{CO}$ and a partial pressure of carbon dioxide $P_{CO2}$ in an atmosphere are measured, for example, with an infrared gas concentration measurement device. Then, an amount of supply of the propane ($C_3H_8$) gas or the butane gas ($C_4H_{10}$) as an enrichment gas is adjusted based on the measurement value such that $a_c^*$ defined in the expression (1) attains to a target value within a range not smaller than 0.88 and not greater than 1.27.

Here, a value for α can be controlled by varying at least any one of a partial pressure of undecomposed ammonia, a partial pressure of hydrogen, and $a_c^*$ through undecomposed $NH_3$ partial pressure control step 31, $H_2$ partial pressure control step 32, and $CO/CO_2$ partial pressure control step 33 with reference to the expression (2). Namely, for example, a value for α may be controlled by varying a partial pressure of hydrogen through $H_2$ partial pressure control step 32 while a partial pressure of undecomposed ammonia and $a_c^*$ are kept constant through undecomposed $NH_3$ partial pressure control step 31 and $CO/CO_2$ partial pressure control step 33, or may be controlled by varying a partial pressure of undecomposed ammonia through undecomposed $NH_3$ partial pressure control step 31 while a partial pressure of hydrogen and a value for $a_c^*$ are kept constant through $H_2$ partial pressure control step 32 and $CO/CO_2$ partial pressure control step 33.

Referring to FIG. 6, in heating pattern control step 40, a history of heating provided to the steel product is controlled. Specifically, as shown in FIG. 9, the steel product is heated to a temperature not lower than 850° C. and not higher than 900° C. (for example, 880° C.) which is not lower than the $A_1$ transformation point in an atmosphere controlled in atmosphere control step 30 described above and held for a time period not shorter than 180 minutes and not longer than 600 minutes (preferably not shorter than 240 minutes and not longer than 480 minutes). Then, as the retention time period elapses, heating pattern control step 40 ends and at the same time atmosphere control step 30 also ends. The steel product may be heated to a temperature not lower than 820° C. and not higher than 880° C. (preferably not lower than 830° C. and not higher than 870° C.) which is not lower than the $A_1$ transformation point in an atmosphere controlled in atmosphere control step 30 described above and held for a time period not shorter than 180 minutes and not longer than 600 minutes (preferably not shorter than 240 minutes and not longer than 480 minutes).

Referring to FIG. 6, after the carbonitriding step ends, the nitrogen diffusion step is performed. In this step, the steel product is heated to a temperature not higher than a treatment temperature in the carbonitriding step and held for a time period not shorter than 30 minutes and not longer than 120 minutes (preferably not shorter than 45 minutes and not longer than 90 minutes). Nitrogen which has penetrated into steel can thus be diffused. In this step, an atmosphere in the heat treatment furnace is controlled such that $a_c^*$ is not smaller than 0.88 and not greater than 1.27 (preferably not smaller than 0.9 and not greater than 1.1) and a value for α is not smaller than 0.003 and not greater than 0.012 (preferably not smaller than 0.003 and not greater than 0.008). The value for $a_c^*$ and the value for α can be controlled as in the carbonitriding step.

Referring to FIG. 6, the cooling step is performed after the nitrogen diffusion step ends. In this step, the steel product is cooled to a temperature not higher than the $M_s$ point as the steel product is immersed in oil (oil cooling). As the steps above (the carbonitriding step, the nitrogen diffusion step, and the cooling step) are successively performed, the surface portion of the steel product is carbonitrided and quench-hardened.

EXAMPLES

Example 1

Influence by an average concentration of nitrogen and variation in nitrogen concentration in the surface portion on durability of the bearing component was initially investigated. Specifically, a scratched contact fatigue life test was conducted with a dent being formed in a raceway surface of a rolling bearing ring (inner ring) and scratched contact life of the inner ring was evaluated. A procedure for an experiment is as follows.

The test was conducted with the use of a deep-groove ball bearing (having an inner diameter of 30 mm, an outer diameter of 62 mm, and a width of 16 mm, and having 9 rolling elements) with a model number 6206 defined under JIS. Initially, an inner ring was fabricated through a procedure similar to that in the present embodiment (a carbonitriding temperature: 850° C., a tempering temperature: 180° C.). In the carbonitriding step, distribution of concentrations of nitrogen which had penetrated around the surface of the inner ring was controlled by adjusting a partial pressure of undecomposed ammonia, a partial pressure of hydrogen, a carbon activity, a heat treatment time period, and a quenching temperature. For comparison, an inner ring without being subjected to the nitrogen diffusion step after the carbonitriding step was also fabricated.

A dent was formed by pressing a diamond cone indenter for measuring a Rockwell hardness against the center of a bottom portion of a groove in the raceway surface of the fabricated inner ring at a load of 196 N. Thirty dents per one inner ring were formed in the circumferential direction at equal intervals (that is, every central angle of 12°).

Then, a bearing was fabricated by combining the fabricated inner ring, the outer ring, the rolling element, and the cage. Then, a life test was conducted on the fabricated bearing. A test machine having such a structure as applying a radial load equally to two bearings was adopted as a test machine. The test was conducted in such a manner that a load of approximately 3.04 GPa was applied to one bearing and the bearing was rotated at the number of revolutions of 3000 rpm. Lubrication was achieved by continuously feeding a constant amount of oil into a housing where a tested bearing is arranged.

Relation between the nitrogen concentration in the surface portion of the inner ring and scratched contact fatigue life was investigated in the test. Relation between variation in nitrogen concentration in the surface portion and scratched contact fatigue life was also investigated in a case that a nitrogen concentration in the surface portion was set to be constant (0.4 mass %). "Variation in nitrogen concentration in the surface portion" was determined with the method the same as in the embodiment above (see FIGS. 3 and 4).

Figure 10:
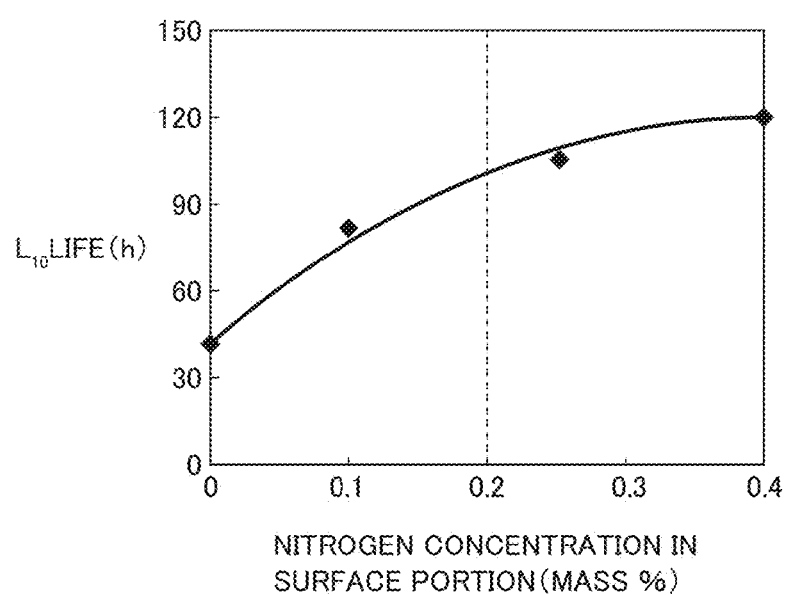
FIG. 10 is a graph showing relation between a nitrogen concentration in the surface portion and scratched contact fatigue life ($L_{10}$ life).
Figure 11:
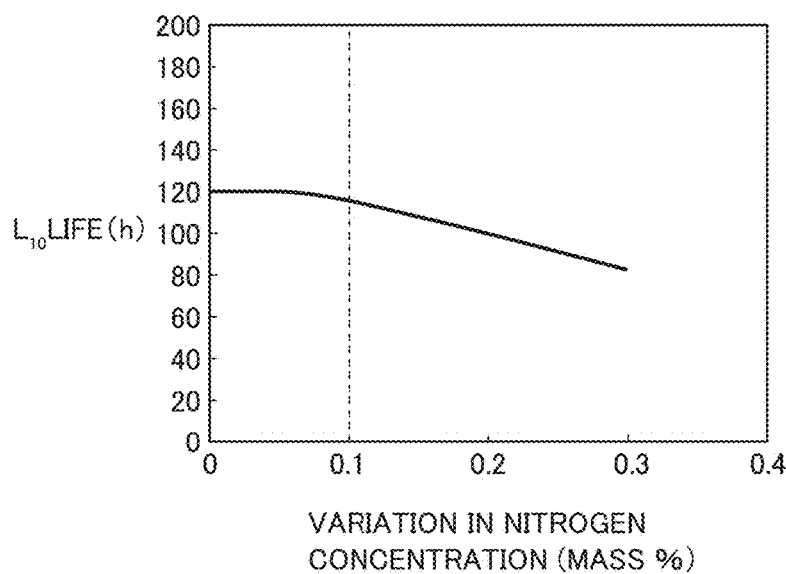
FIG. 11 is a graph showing relation between variation in nitrogen concentration in the surface portion and scratched contact fatigue life ($L_{10}$) life.

FIGS. 10 and 11 show results of the tests. FIG. 10 shows relation between the nitrogen concentration (abscissa, mass %) in the surface portion of the inner ring and $L_{10}$ life (ordinate, h) of scratched contact fatigue life. FIG. 11 shows relation between variation (abscissa, mass %) in nitrogen concentration in the surface portion of the inner ring and $L_{10}$ life (ordinate, h) of scratched contact fatigue life.

As shown in FIG. 10, when the nitrogen concentration in the surface portion is lower than 0.2 mass % (shown with a dashed line in FIG. 10), $L_{10}$ life has decreased. On the other hand, as will be described in connection with results of investigation which will be described later, when a concentration of nitrogen in the surface portion exceeds 0.7 mass %, an amount of retained austenite was excessive and a hardness of the contact surface lowered to 700 HV or lower (see FIGS. 19 and 20).

As shown in FIG. 11, when variation in nitrogen concentration was not higher than 0.1 mass % (shown with a dashed line in FIG. 11), $L_{10}$ life not shorter than a certain level was ensured, whereas when variation exceeded 0.1 mass %, $L_{10}$ life significantly became short. It was found from these results that it was effective to set the nitrogen concentration in the surface portion to 0.2 mass % or higher and 0.7 mass % or lower, that is, to set the average concentration of nitrogen in the surface portion to 0.3 mass % or higher and 0.6 mass % or lower and to set variation in nitrogen concentration in the surface portion to 0.1 mass % or lower, in order to suppress shorter scratched contact life and lowering in hardness of the contact surface and to maintain the hardness of the contact surface to 700 HV or higher.

Example 2

Relation between variation in nitrogen concentration in the surface portion and an inclination of the nitrogen concentration was then be investigated. The inner ring was fabricated initially by performing the steps (S10) to (S30) through the procedure the same as in the present embodiment (Example). A time period for the carbonitriding step was set to 4 hours and a time period for the nitrogen diffusion step was set to 1 hour. For comparison, an inner ring not subjected to the nitrogen diffusion step after the carbonitriding step was also fabricated (Comparative Example). Then, distribution of nitrogen concentrations around the surface layer of the inner ring fabricated before the finishing step (S40) was performed was investigated.

Figure 12:
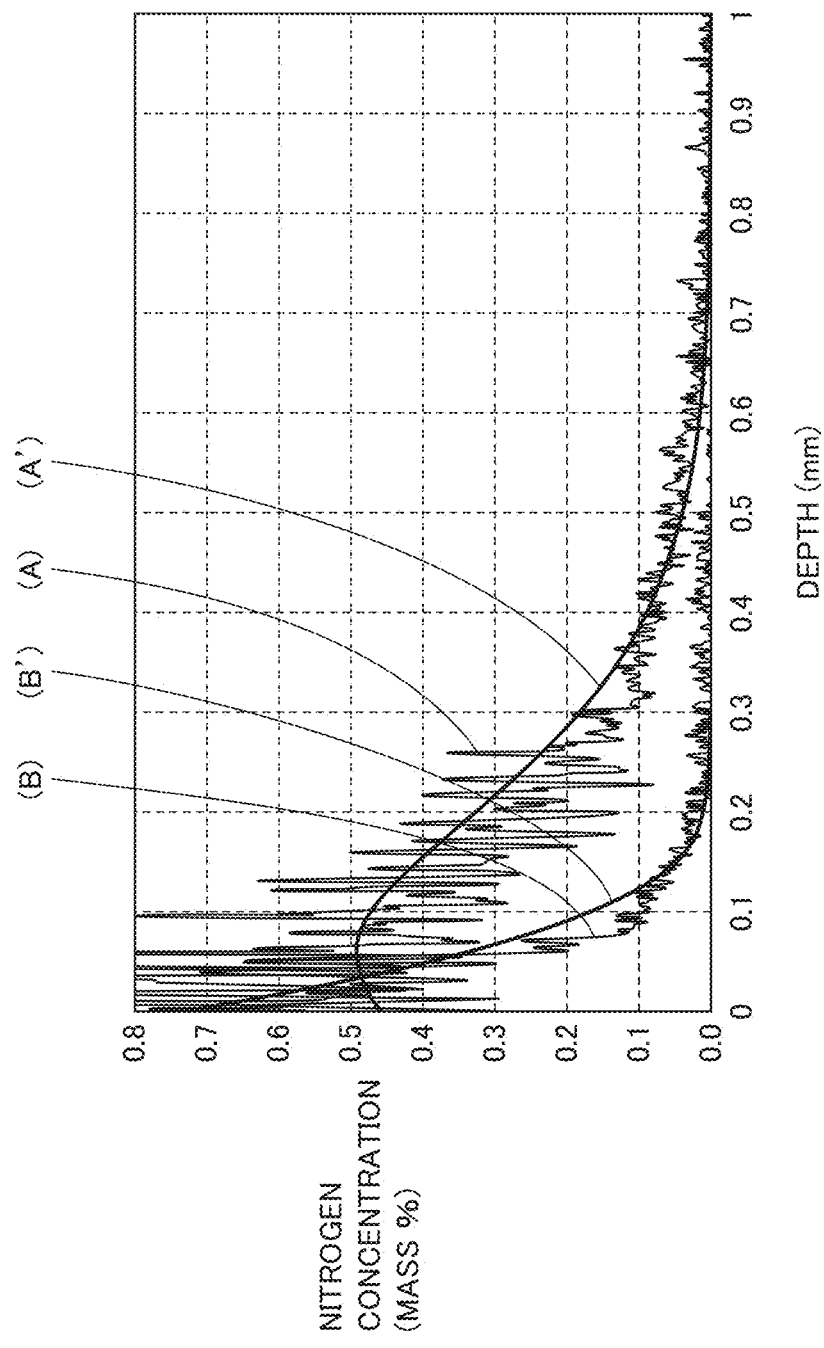
FIG. 12 is a graph showing distribution of nitrogen concentrations around a surface layer of an inner ring.

FIG. 12 shows distribution of nitrogen concentrations in a direction of depth of the fabricated inner ring. In FIG. 12, the abscissa represents a depth (mm) in the inner ring and the ordinate represents a nitrogen concentration (mass %). In FIG. 12, (A) represents results of measurement in Example, (A') represents an approximation curve of the results of measurement in Example, (B) represents results of measurement in Comparative Example, and (B') represents an approximation curve of the results of measurement in Comparative Example. For example, when an inclination of a nitrogen concentration between two depths where the nitrogen concentrations were 0.3 mass % and 0.1 mass %, respectively, is calculated, the inclination of the nitrogen concentration was obtained based on a relational expression (0.3-0.1)/distance (m), and consequently, the inclination of the nitrogen concentration was greater in Example than in Comparative Example (not less than −15 (1/m)). When the finishing step (S40) is performed such that the average concentration of nitrogen in the surface portion was 0.4 mass % with an amount of deformation of the inner ring in heat treatment being 0.2 mm, variation in nitrogen concentration in the surface portion was 0.25 mass % in Comparative Example, whereas variation was 0.08 mass % (not higher than 0.1 mass %) in Example. It was found from this result that it was effective to perform the nitrogen diffusion step after the carbonitriding step for lessening variation in nitrogen concentration in the surface portion after finishing.

Example 3

Then, an experiment for investigating influence by an average amount of retained austenite around the surface layer and variation in amount of retained austenite on durability of the bearing component was conducted. Initially, an inner ring was fabricated through the procedure the same as in the embodiment above. The carbonitriding step was performed such that an average concentration of nitrogen in the surface portion was 0.4 mass %. In the tempering step, an amount of retained austenite around the raceway surface of the inner ring was controlled by adjusting a treatment temperature. Then, a bearing was fabricated by combining the fabricated inner ring and other bearing components (the outer ring, the rolling elements, and the cage) with one another. Then, a life test was conducted as in Example 1.

Figure 13:
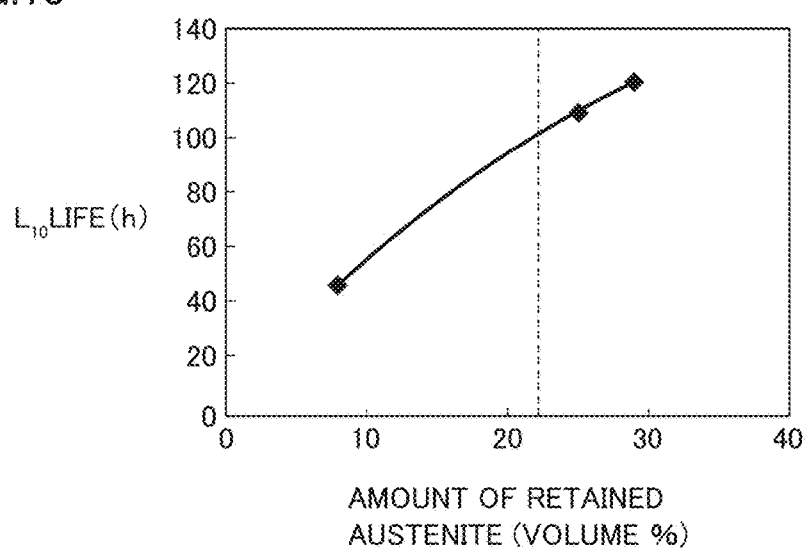
FIG. 13 is a graph showing relation between an amount of retained austenite around the surface layer and scratched contact fatigue life ($L_{10}$ life).

FIG. 13 shows relation between an amount of retained austenite (abscissa, volume %) at a position at a depth of 0.05 mm from the raceway surface of the inner ring and $L_{10}$ life (ordinate, h) of scratched contact fatigue life. As shown in FIG. 13, with increase in amount of retained austenite, $L_{10}$ life was longer (when an amount of retained austenite exceeded 22 volume %, $L_{10}$ life was not shorter than 100 h). When an amount of retained austenite exceeded 38 volume %, a hardness of the contact surface was lowered to 700 HV or lower. It was found from this result that, in order to suppress shorter scratched contact life and lowering in hardness of the contact surface, it was effective to set an amount of retained austenite at a position at a depth of 0.05 mm from the raceway surface to be not lower than 22 volume % and not higher than 38 volume %, that is, to set an average amount of retained austenite at the depth position above to be not lower than 25 volume % and not higher than 35 volume % and set variation in amount of retained austenite at the depth position above to be not higher than 3 volume %.

Example 4

Then, influence by an average amount of retained austenite in the bearing component as a whole on dimension accuracy of the bearing component was investigated. Initially, a ring-shaped test specimen having an outer diameter (ϕ) of 60 mm, an inner diameter (ϕ) of 54 mm, and a width (t) of 15 mm was fabricated with a temperature for carbonitriding, a tempering temperature, and a concentration of nitrogen in the surface portion being varied. Then, this test specimen was subjected to heat treatment in which it was held at 120° C. for 2500 hours, and long-term dimensional variation was calculated by dividing a difference in dimension of the outer diameter between before and after the heat treatment by the outer diameter before the heat treatment.

Figure 14:
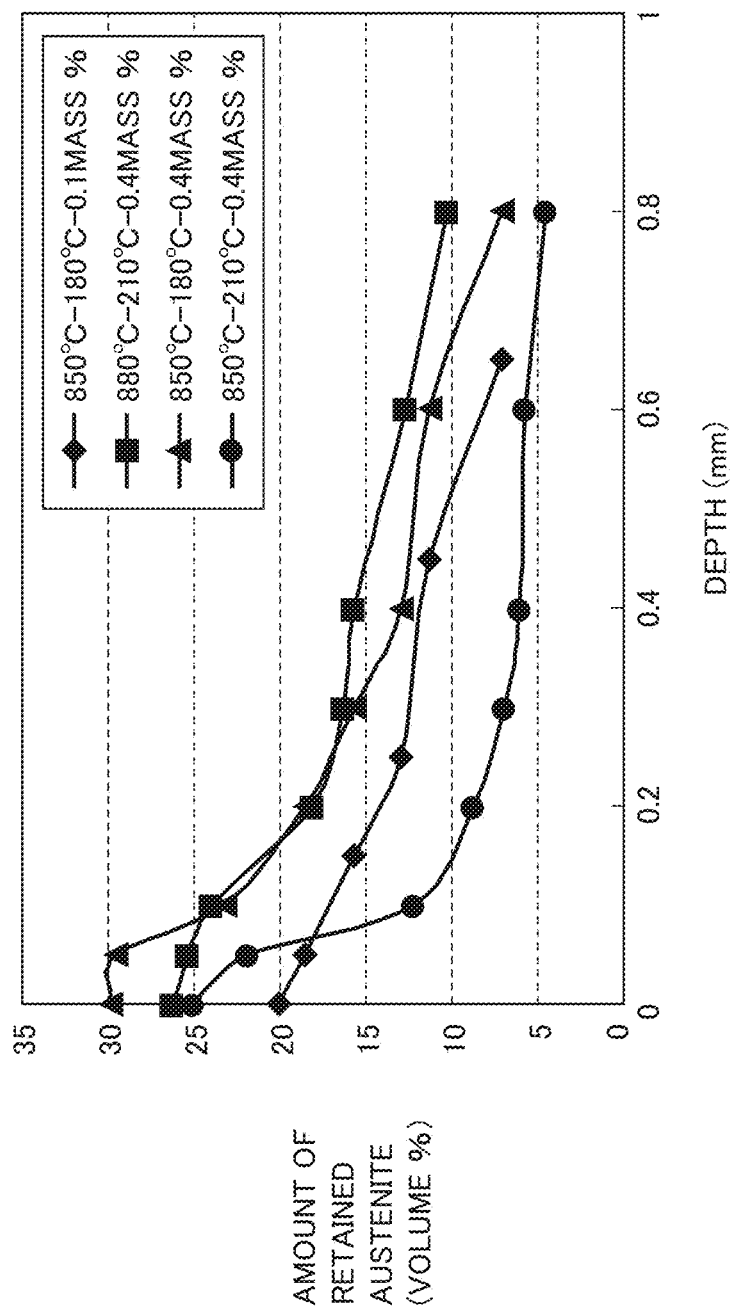
FIG. 14 is a graph showing distribution of amounts of retained austenite around the surface layer of a test specimen.
Figure 15:
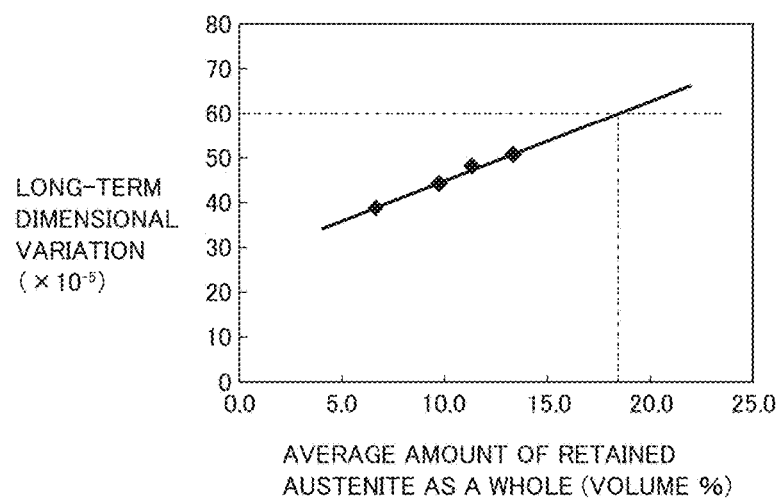
FIG. 15 is a graph showing relation between an average amount of retained austenite and long-term dimensional variation.

FIG. 14 shows relation between a depth (abscissa, mm) from the surface of a test specimen and an amount of retained austenite (ordinate, volume %). Legends in FIG. 14 each show a condition for heat treatment with a denotation "carbonitriding temperature-tempering temperature-concentration of nitrogen in surface portion." For example, a denotation "850° C.-180° C.-0.1 mass %" shows that a temperature for carbonitriding was set to 850° C., a tempering temperature was set to 180° C., and a concentration of nitrogen in the surface portion was 0.1 mass %. An average amount of retained austenite in the test specimen was calculated based on distribution of amounts of retained austenite in FIG. 14, and relation thereof with long-term dimensional variation of a corresponding test specimen which had been calculated previously was investigated. FIG. 15 shows relation between an average amount of retained austenite (abscissa, volume %) of the test specimen as a whole and long-term dimensional variation (ordinate).

As shown in FIG. 15, the average amount of retained austenite and long-term dimensional variation were in proportion to each other. Long-term dimensional variation could be lowered to $60 \times 10^{-5}$ or lower by setting the average amount of retained austenite to 18 volume % or lower.

Example 5

Then, influence by a carbonitride which exists in the surface portion on a static load capacity of the bearing component was investigated. In steel containing chromium (Cr), when nitrogen penetrates into steel through carbonitriding treatment or the like, a concentration of chromium in a base material lowers and a region of single-phase austenite extends and hence terminal solid solubility of carbon increases. Consequently, when carbonitriding treatment at a high concentration is performed without taking measures in particular, a carbonitride decreases or disappears in spite of absence of decarbonization. Here, from a point of view of higher strength of the bearing component, it seems preferable to allow a carbonitride to remain to thereby make use of a precipitation strengthening function of the carbonitride.

In the present embodiment, disappearance of a carbonitride is suppressed by setting a value for carbon activity $a_c^*$ in the carbonitriding step to 0.88 or higher and 1.27 or lower and to carry out carburization before increase in terminal solid solubility of carbon in a nitrogen-enriched layer. An experiment for confirming an effect of this remaining carbonitride was conducted.

Figure 16:
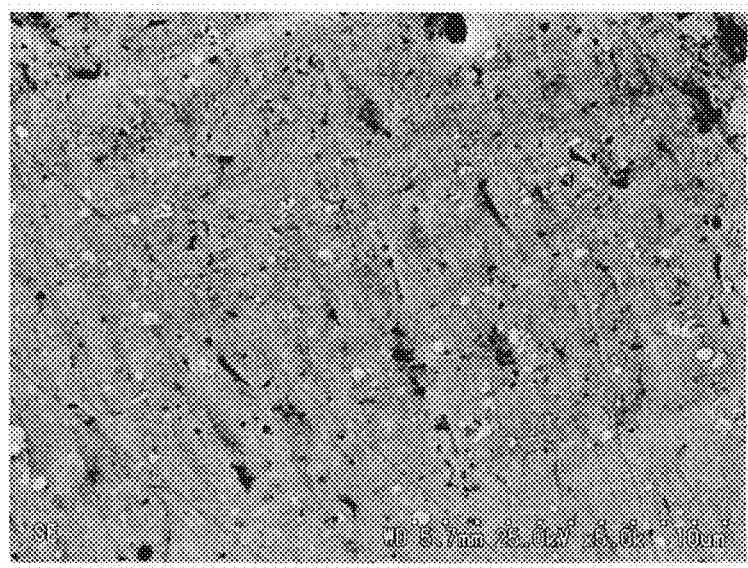
FIG. 16 shows a cross-sectional SEM photograph of a test specimen in a Comparative Example.
Figure 17:
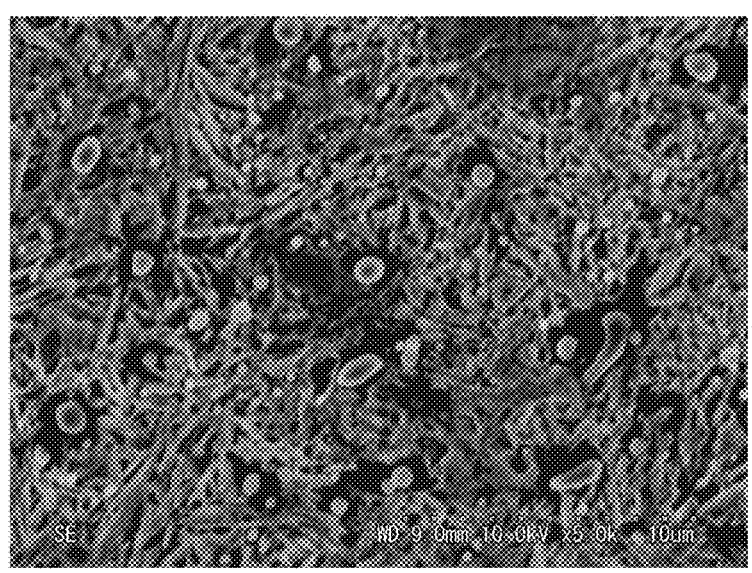
FIG. 17 shows a cross-sectional SEM photograph of a test specimen in an Example.

FIG. 16 shows a cross-sectional scanning electron microscope (SEM) photograph (at a magnification of 5000×) of a test specimen in carbonitriding with a conventional method and FIG. 17 shows a cross-sectional SEM photograph (at a magnification of 5000×) of a test specimen in a case that carbonitriding was carried out ($a_c^*=1$) through the procedure the same as in the present embodiment. The carbonitride almost disappeared in the photograph in FIG. 16, whereas at least five carbonitrides having a diameter not greater than 0.5 μm were present per 100 μm² in the photograph in FIG. 17.

Figure 18:
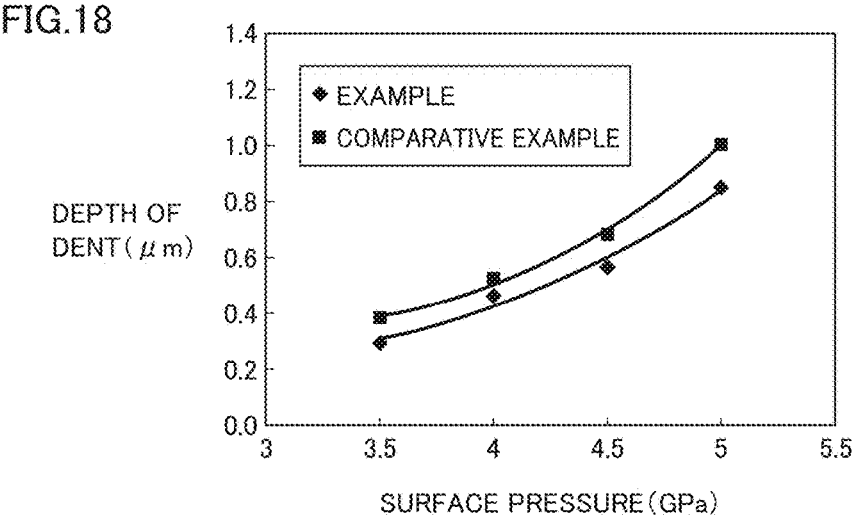
FIG. 18 is a graph showing influence by existence of a carbonitride on a depth of a dent.

Then, in order to confirm the effect of the carbonitride, an experiment in which a test specimen was subjected to carbonitriding treatment under different conditions, samples having a hardness of 750 HV were fabricated with an amount of existence (number density) of a carbide being varied, and a depth of a dent formed by pressing a ball made of silicon nitride having a diameter (ϕ) of 9.525 mm against a surface of the sample was measured was conducted. FIG. 18 shows results of the experiment. In FIG. 18, the abscissa represents a pressure (GPa) with which the ball made of silicon nitride was pressed and the ordinate represents a depth (μm) of the dent formed by pressing with the ball. In FIG. 18, a square mark represents a result of measurement of a sample (Comparative Example) in which the carbonitride disappeared and a rhombic mark represents a result of measurement of a sample (Example) in which five or more carbonitrides having a diameter not greater than 0.5 μm were present per 100 μm².

As shown in FIG. 18, it was confirmed that a depth of the dent was smaller in the sample in which five or more carbonitrides having a diameter not greater than 0.5 μm were present per 100 μm² than in the sample in which the carbonitride disappeared. It was found from this result that, in order to improve a static load capacity of the bearing component, it was effective that five or more carbonitrides having a diameter not greater than 0.5 μm were present per 100 μm² in the surface portion.

Example 6

Then, influence by a concentration of nitrogen in a non-ground portion and an amount of retained austenite on a hardness of a non-ground surface was investigated. Initially, a bearing component was fabricated through a procedure the same as in the present embodiment. Here, a concentration of nitrogen in a non-ground portion such as a corner portion or a recess portion and an amount of retained austenite were varied. Then, relation of a concentration of nitrogen in the non-ground portion and an amount of retained austenite with a hardness of the non-ground surface was investigated.

Figure 19:
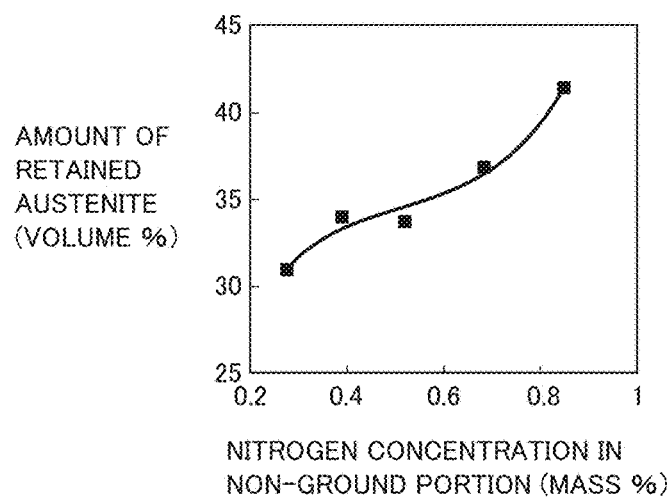
FIG. 19 is a graph showing relation between a concentration of nitrogen in a non-ground portion and an amount of retained austenite.
Figure 20:
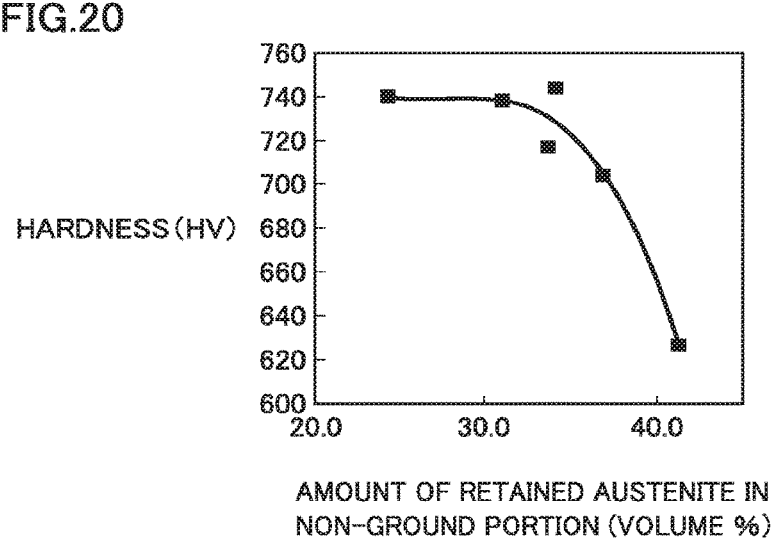
FIG. 20 is a graph showing relation between an amount of retained austenite in the non-ground portion and a cross-section hardness around a non-ground surface.

FIGS. 19 and 20 show results of an experiment. In FIG. 19, the abscissa represents a concentration of nitrogen (mass %) in the non-ground portion and the ordinate represents an amount of retained austenite (volume %) in the non-ground portion. In FIG. 20, the abscissa represents an amount of retained austenite (volume %) in the non-ground portion and the ordinate represents a hardness (HV) at a position at a depth of 0.1 mm from the non-ground surface. As shown in FIG. 19, when a concentration of nitrogen in the non-ground portion was not lower than 0.7 mass %, an amount of retained austenite was not lower than 35 volume %. As shown in FIG. 20, when an amount of retained austenite in the non-ground portion was not lower than 35 volume %, a cross-section hardness at the depth position above lowered to 700 HV or lower. It was found from this result that it was effective to set a concentration of nitrogen in the non-ground portion to less than 0.7 mass % in order to ensure a sufficient hardness of the non-ground portion.

Figure 21:
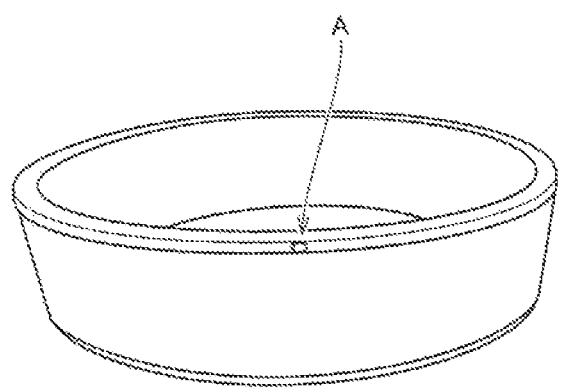
FIG. 21 shows a schematic perspective view showing a rolling bearing ring where a dent was produced in the non-ground portion.

In general, 80 to 90% of machine failure accidents has been caused by fatigue. A portion from which such a failure originates is a portion of which shape has been changed, such as a hole, a notch, a stepped portion, a crack, a defect, or a dent. Namely, a component fails due to concentration of stress in such a portion of which shape has been changed and resultant lowering in fatigue strength. When a hardness of the non-ground surface is low, a dent A is produced during assembly or transportation as shown in the schematic perspective of FIG. 21, and stress is concentrated to dent A, which is highly likely to be an origin of failure. Therefore, in order to ensure sufficient durability of a product, a hardness of the non-ground surface not lower than 700 HV should be ensured.

Example 7

A method for determining a position of measurement of a cross-section hardness and a reference value for a difference in cross-section hardness for ensuring that a nitrogen concentration in the contact surface of the bearing component is not lower than 0.4 mass % will now be described.

(1) As to Test Specimen and Method of Experiment (1-1) Introduction

Initially, a heating temperature and a retention time period in high-temperature tempering which highly correlate with a nitrogen concentration should be determined. Here, since transformation through high-temperature tempering is a process of thermal activation, increase in heating temperature and extension of the retention time period are the same in meaning, and it does not seem to be significant to define both of them as variables. Then, in the present Example, an optimal heating temperature was determined by searching for a heating temperature at which a difference in hardness is clearest, with the retention time period being fixed to be constant (1 hour) and with a heating temperature being varied among 300° C., 400° C., 500° C., 600° C., and 700° C.

A difference in hardenability owing to a difference in chemical component of each material or a difference in cooling rate during quenching may affect a hardness after quenching and also a hardness after high-temperature tempering. Therefore, in the present Example, an absolute value itself of a cross-section hardness is not employed, but a difference (difference in hardness) between a hardness at a deep position (a core portion) from an unnitrided surface layer (here, for example, a hardness at a depth of 1 mm from an outermost surface after heat treatment) and a hardness at a position at any depth in a nitrided region was adopted as an indicator. Namely, a chemical component of a material may be different among material lots, and a difference in hardness serves to offset such a difference.

(1-2) Test Specimen of Interest

Table 1 shows chemical components of a test specimen to be investigated. Materials were all within the range of components above, and were subjected to the carbonitriding treatment in various heat treatment furnaces and heat treatment atmospheres. A temperature for the carbonitriding treatment was included in a range not lower than 840° C. and not higher than 860° C.

TABLE 1

| Test Specimen No. | Chemical Component (Mass %) | | | | | | | |
|---|---|---|---|---|---|---|---|---|
| | C | Si | Mn | Ni | Cr | Mo | Cu | O* |
| 1 | 1.03 | 0.25 | 0.35 | 0.01 | 1.50 | 0 | 0.01 | 4 |
| 2 | Unknown | | | | | | | |
| 3 | 0.98 | 0.27 | 0.47 | 0.05 | 1.45 | 0.02 | 0.10 | 6 |
| 4 | 1.00 | 0.27 | 0.35 | 0.02 | 1.51 | 0 | 0.01 | 7 |
| 5 | 1.01 | 0.24 | 0.35 | 0.01 | 1.49 | 0 | 0.01 | 3 |

TABLE 1-continued

| Test Specimen No. | Chemical Component (Mass %) | | | | | | | |
|---|---|---|---|---|---|---|---|---|
| | C | Si | Mn | Ni | Cr | Mo | Cu | O* |
| 6 | 0.99 | 0.26 | 0.37 | 0.02 | 1.44 | 0 | 0.01 | 5 |
| 7 | Unknown | | | | | | | |
| 8 | 0.98 | 0.25 | 0.34 | 0.07 | 1.43 | 0.03 | 0.10 | 6 |
| 9 | 0.98 | 0.25 | 0.34 | 0.07 | 1.43 | 0.03 | 0.10 | 6 |
| 10 | 0.98 | 0.25 | 0.34 | 0.07 | 1.43 | 0.03 | 0.10 | 6 |

Specifically, a test specimen No. 1 was subjected to the carbonitriding treatment under such conditions that a treatment temperature was set to 850° C., a treatment time period was set to 120 minutes (min.) (hereinafter denoted, for example, as "850° C.×120 min."), an undecomposed ammonia fraction was set to 0.2 volume %, and a carbon activity was set to 0.9. A test specimen No. 2 was subjected to the carbonitriding treatment under such conditions as 840° C.×70 min., an undecomposed ammonia fraction of 0.1 volume %, and a carbon activity of 0.85. A test specimen No. 3 was subjected to the carbonitriding treatment under such conditions as 850° C.×120 min., an undecomposed ammonia fraction of 0.1 volume %, and a carbon activity of 0.9. A test specimen No. 4 was subjected to the carbonitriding treatment under such conditions as 850° C.×90 min., an undecomposed ammonia fraction of 0.1 volume %, and a carbon activity of 0.9. A test specimen No. 5 was subjected to the carbonitriding treatment under such conditions as 850° C.×90 min., an undecomposed ammonia fraction of 0.1 volume %, and a carbon activity of 0.9.

A test specimen No. 6 was subjected to the carbonitriding treatment under such conditions as 850° C.×90 min., an undecomposed ammonia fraction of 0.13 volume %, and a carbon activity of 0.9. A test specimen No. 7 was subjected to the carbonitriding treatment under such conditions as 850° C.×150 min., an undecomposed ammonia fraction of 0.1 volume %, and a carbon activity of 0.85. A test specimen No. 8 was subjected to the carbonitriding treatment under such conditions as 850° C.×150 min., an undecomposed ammonia fraction of 0.25 volume %, and a carbon activity of 0.9. A test specimen No. 9 was subjected to the carbonitriding treatment under such conditions as 850° C.×180 min., an undecomposed ammonia fraction of 0.3 volume %, and a carbon activity of 0.95. A test specimen No. 10 was subjected to the carbonitriding treatment under such conditions as 850° C.×90 min., an undecomposed ammonia fraction of 0.2 volume %, and a carbon activity of 0.9.

(1-3) Method of Measuring Nitrogen Concentration

In order to investigate correlation between a cross-section hardness and a nitrogen concentration of the sample subjected to high-temperature tempering, distribution of nitrogen concentrations in the sample (steel) should be measured. EPMA line analysis was employed for measurement of a nitrogen concentration in steel subjected to the carbonitriding treatment. Quantification was carried out by analyzing a calibration test specimen having an already-known nitrogen concentration and using a calibration curve thereof. A schematic diagram of a sample and a measurement method used in electron probe micro analysis (EPMA) are as shown in FIG. 22.

Figure 22:
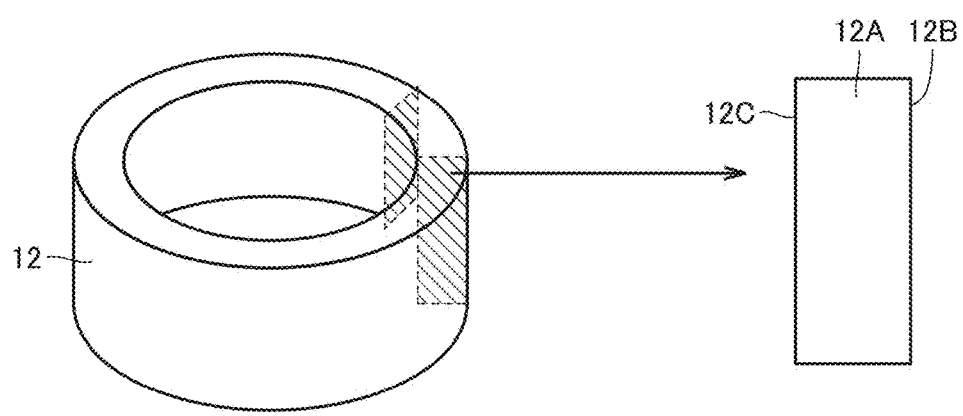
FIG. 22 is a schematic diagram for illustrating a method of measuring a nitrogen concentration in a sample.

For example, a case that inner ring 12 is employed as the sample as shown in FIG. 22 will be discussed. A nitrogen concentration of the sample after the carbonitriding treatment was measured. Specifically, a test specimen 12A as shown in FIG. 22 was cut from the sample, and a cut end surface at a central portion in a direction of height of test specimen 12A (a portion at a half width) was subjected to EPMA line analysis along a direction from an outer circumferential surface 12B of the test specimen toward inner circumferential surface 12C.

(1-4) Method of Measuring Cross-Section Hardness

In test specimen 12A described in (1-3), a hardness was measured at the cut end surface for which EPMA analysis was conducted. For measurement, a Vickers hardness was measured with a microvickers hardness tester.

(2) Search for Retention Temperature in High-Temperature Tempering (2-1) Contents of Experiment In order to search for a tempering temperature (heating temperature) which highly correlates with a nitrogen concentration, test specimen 12A tempered at a heating temperature of 180° C. for a retention time period of 2 hours after the carbonitriding treatment was subjected to five types of high-temperature tempering in which heating temperatures of 300° C., 400° C., 500° C., 600° C., and 700° C. were set, respectively, and the retention time period was set to 1 hour. An air atmosphere was adopted as an atmosphere during high-temperature tempering. Then, a cross-section hardness of the test specimen treated under each high-temperature tempering condition was measured. Here, test specimens having Nos. 8 and 9 under conditions for the carbonitriding treatment which seem to be large in an amount of penetration of nitrogen were subjected to measurement.

(2-2) Results of Experiment

Figure 23:
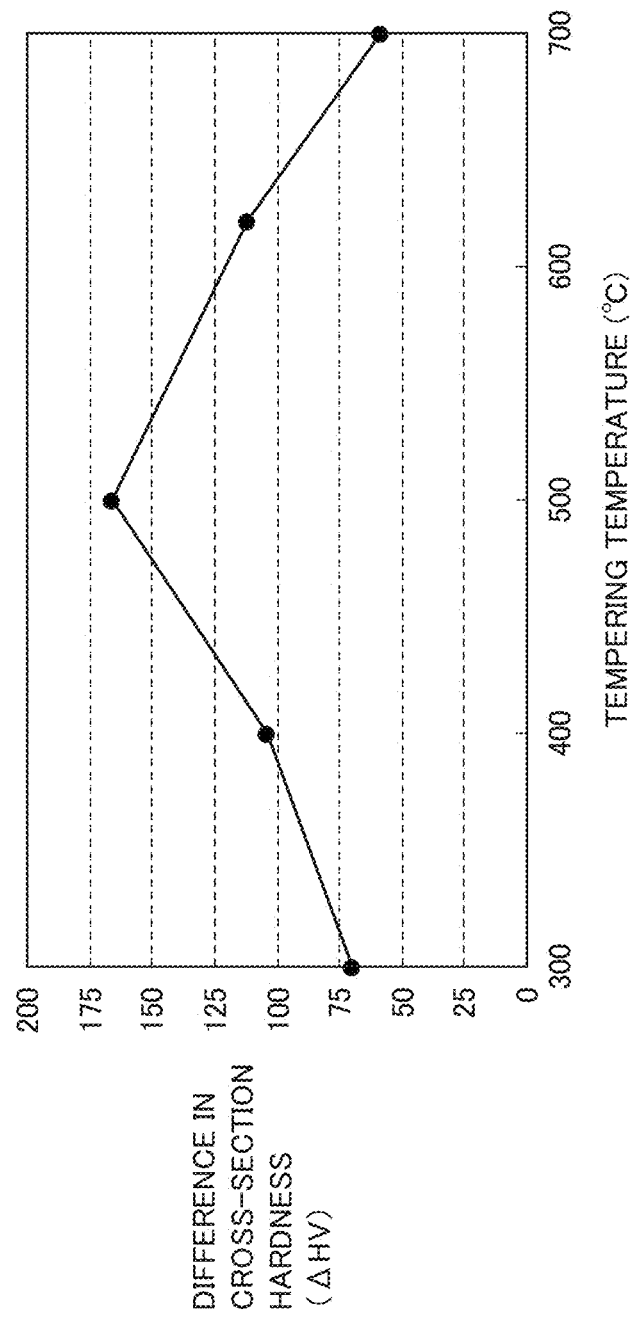
FIG. 23 is a graph showing relation between a tempering temperature and a difference in cross-section hardness.

FIG. 23 shows a graph summarizing results of the experiment. The graph shown in FIG. 23 summarizes the results of the experiment with the abscissa representing a tempering temperature (° C.) and the ordinate representing a difference in cross-section hardness (that is, (a maximum value for the cross-section hardness)–(a cross-section hardness at a position at a depth of 1 mm from an outermost surface after heat treatment): also denoted as $\Delta HV$). As can be seen in FIG. 23, difference in cross-section hardness $\Delta HV$ was greatest after high-temperature tempering in which the heating temperature was set to 500° C. and the retention time period was set to 1 hour. Difference in cross-section hardness $\Delta HV$ at the time when this heating temperature was set to 500° C. exhibited a value approximately twice as high as difference in cross-section hardness $\Delta HV$ after high-temperature tempering in which the heating temperature was set to 300° C. or 700° C. Therefore, a hardness after tempering which relatively highly correlates with a nitrogen concentration seems to be a hardness after tempering in which the heating temperature was set to around 500° C. Therefore, in an experiment below, a cross-section hardness of a test specimen subjected to high-temperature tempering in which the heating temperature was set to 500° C. and the retention time period was set to 1 hour was measured.

(3) Investigation of Relation Between Nitrogen Concentration and Difference in Cross-Section Hardness ($\Delta HV$)

Figure 24:
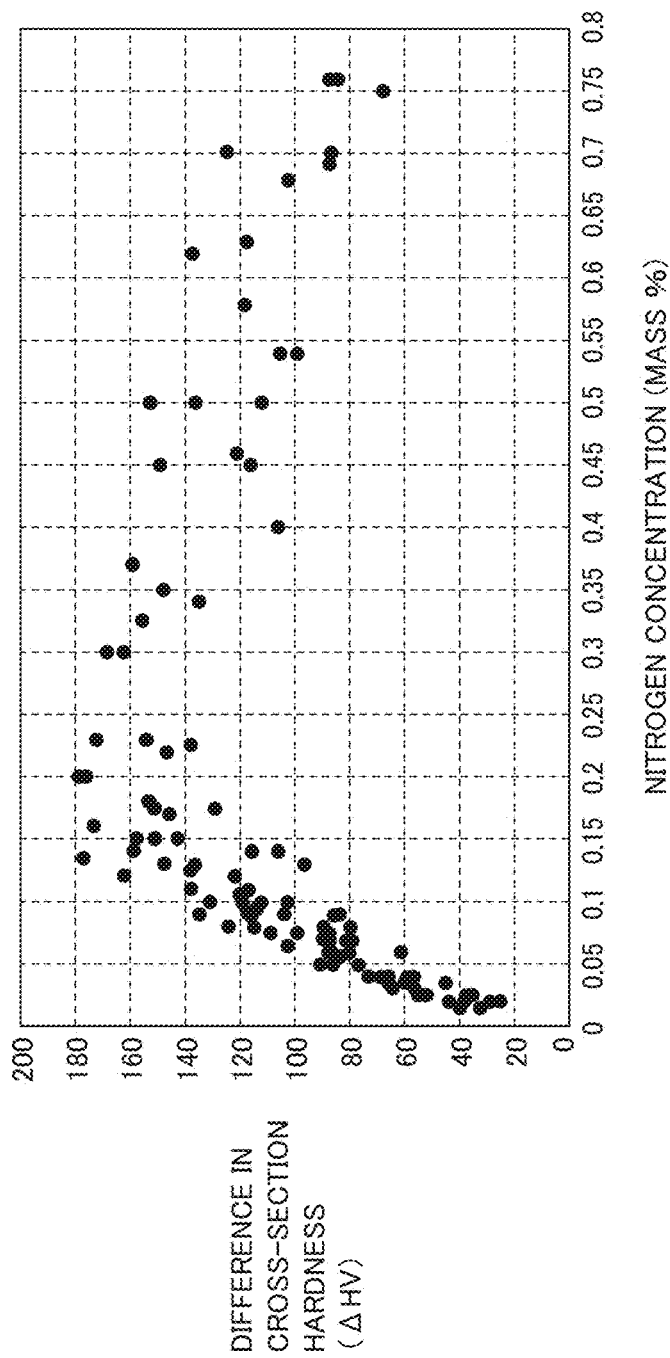
FIG. 24 is a graph showing relation between a nitrogen concentration and a difference in cross-section hardness.
Figure 25:
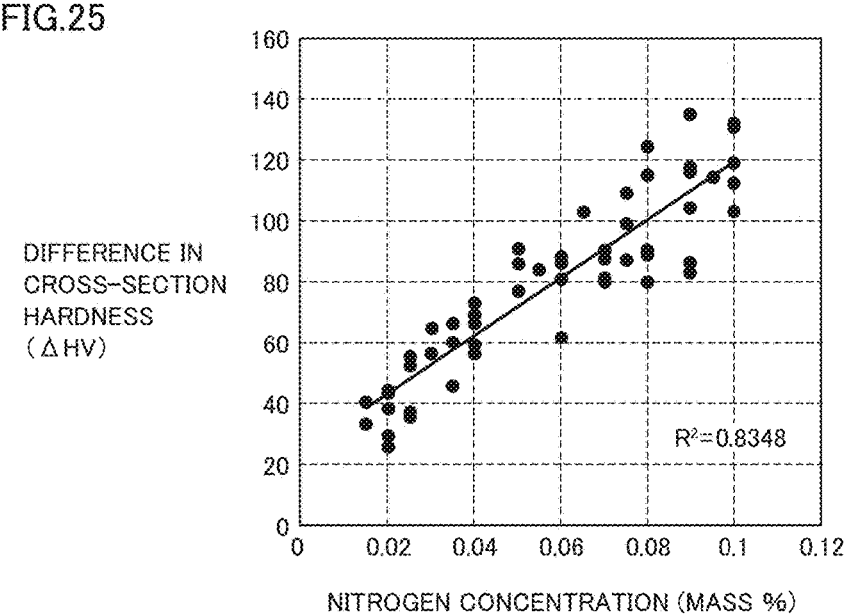
FIG. 25 is a graph showing relation between a nitrogen concentration in a range where a nitrogen concentration is not higher than 0.1 mass % and a difference in cross-section hardness.

Here, each test specimen having a composition shown in Table 1 was subjected to the carbonitriding treatment, a heat treatment in which the heating temperature was set to 500° C. and the retention time period was set to 1 hour was carried out as high-temperature tempering, and thereafter a nitrogen concentration in test specimen 12A was measured through EPMA analysis as described with reference to FIG. 22. The carbonitriding treatment was carried out under such a condition that a heating temperature was set to 850° C. and a value for carbon activity/undecomposed ammonia fraction ($\gamma$) was 4.75. A cross-section hardness of test specimen 12A was measured in a direction of depth at the cut end surface shown in FIG. 22. Then, relation of a difference between a cross-section hardness at a certain position in the direction of depth and a cross-section hardness at a position at a depth of 1 (mm) from the outermost surface after heat treatment (difference in cross-section hardness ($\Delta HV$)) was investigated. FIGS. 24 and 25 show results.

In FIGS. 24 and 25, the abscissa represents a nitrogen concentration (mass %) and the ordinate represents a difference in cross-section hardness ($\Delta HV$) (the unit being a Vickers hardness). FIG. 25 shows extraction of relation between a nitrogen concentration and a difference in cross-section hardness in the range of a nitrogen concentration from 0 to 0.1 mass % from FIG. 24. It was found from FIG. 24 that correlation between the nitrogen concentration and the difference in cross-section hardness was strong in a range of the nitrogen concentration exceeding 0 and not higher than 0.1 mass %, whereas correlation between the nitrogen concentration and the difference in cross-section hardness was relatively weak in a range of the nitrogen concentration exceeding 0.1 mass %. This may be because incomplete quenching may occur in a region high in nitrogen concentration and because nitrogen in a solid solution state in the test specimen does not necessarily contribute to lowering in rate of decomposition of martensite. In FIG. 25, when a coefficient of correlation between the nitrogen concentration and the difference in cross-section hardness is calculated in the range of the nitrogen concentration exceeding 0 and not higher than 0.1 mass %, the coefficient of correlation therebetween is as high as 0.8348. Therefore, it is expected that a nitrogen concentration can be estimated from a difference in cross-section hardness if the nitrogen concentration is in the range from 0 to 0.1 mass %. Therefore, in an experiment below, relation between the nitrogen concentration of 0.06 mass % and the difference in cross-section hardness of 80 $\Delta HV$ at a position substantially intermediate in a region in which the nitrogen concentration and the difference in cross-section hardness have positive correlation (from 0 to 0.1 mass %) is employed.

(4) Relation Between Time Period for Carbonitriding Treatment and Distribution of Nitrogen Concentrations A constituent element of a rolling bearing is ground after quenching and tempering, for shaping thereof. Therefore, when the carbonitriding treatment is performed under a constant treatment condition, a nitrogen concentration in the outermost surface (the raceway surface or the rolling contact surface) of a product will vary depending on grinding allowance. Therefore, in order to keep the nitrogen concentration in the outermost surface of the product at 0.4 mass % or higher, a condition for the carbonitriding treatment should be varied based on grinding allowance on one side.

Figure 26:
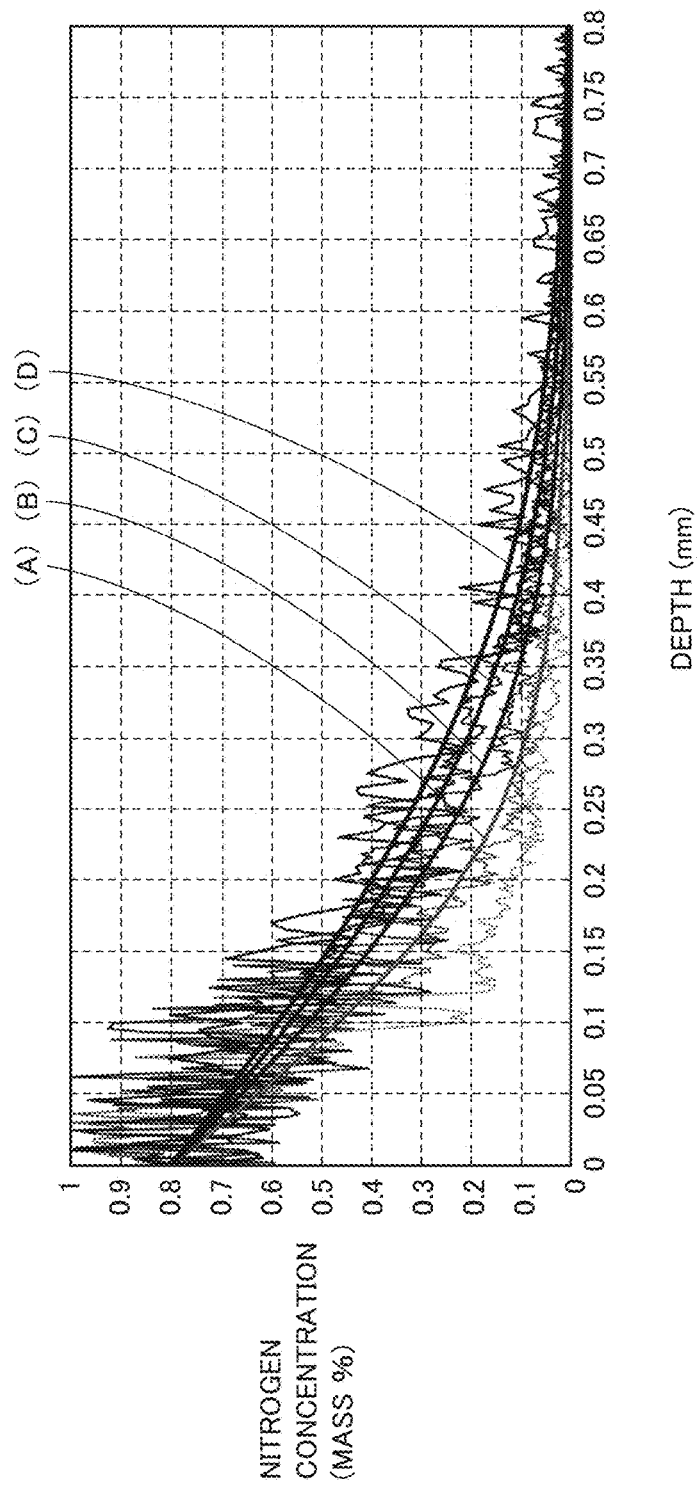
FIG. 26 is a graph showing distribution of nitrogen concentrations in steel after carbonitriding treatment.
Figure 29:
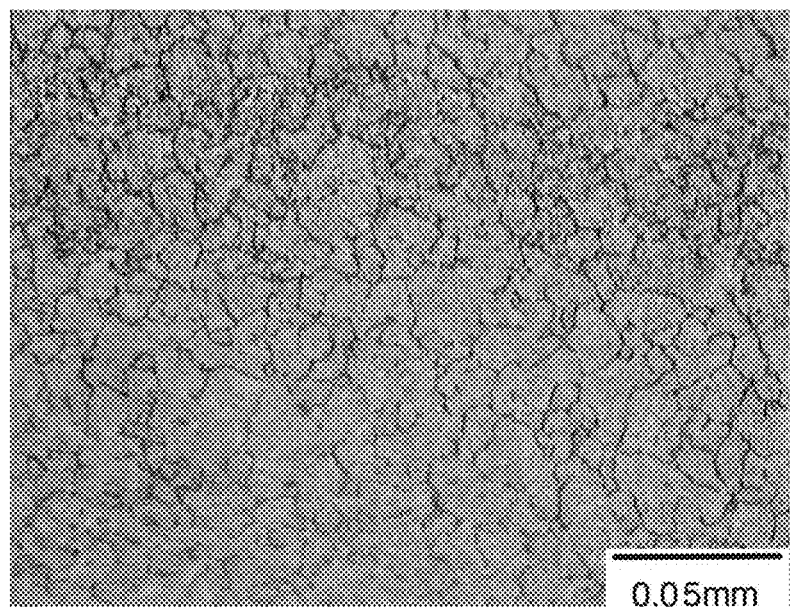
FIG. 29 shows a photograph showing a size of crystal grains of prior austenite.

FIG. 26 shows distribution of nitrogen concentrations (before high-temperature tempering) in a case that steel in the range of components above was subjected to the carbonitriding treatment with a heating temperature being set to 850° C., a value for carbon activity/undecomposed ammonia fraction ($\gamma$) being set to 4.75, and treatment time periods being set to 4 hours ((A) in the figure), 6 hours ((B) in the figure), 8 hours ((C) in the figure), and 10 hours ((D) in the figure). The abscissa in FIG. 26 represents a depth (mm) from the surface and the ordinate represents a nitrogen concentration (mass %). Here, if the carbonitriding treatment is performed under such a condition that a value for $\gamma$ is greater than 5, an amount of penetration of nitrogen will lower and a region where a nitrogen concentration is high will be closer toward the surface. Consequently, with a method other than a method of setting a treatment time period to be very long, it becomes virtually difficult to set a nitrogen concentration in the surface of the product to 0.4 mass % or higher. When a temperature for the carbonitriding treatment is not lower than 860° C., it is difficult to keep a value for γ at 5 or smaller, and when a temperature for the carbonitriding treatment is not higher than 840° C., a rate of diffusion of nitrogen into steel is low and consequently the time period for treatment is longer. Therefore, a temperature around 850° C. is appropriate for the carbonitriding treatment of steel. A heating temperature during the carbonitriding treatment can be determined based on a size of a crystal grain of quenched prior austenite, and when the heating temperature is set to 850° C., a size of a crystal grain of prior austenite in steel is within a range from No. 9 to No. 11 defined under JIS as shown in FIG. 29.

It was found from FIG. 26 that a nitrogen concentration in the outermost surface of the product could be not lower than 0.4 mass % by setting a time period for the carbonitriding treatment to 4 hours when a grinding allowance on one side of the outermost surface of the product was 0.125 (mm), setting a time period for the carbonitriding treatment to 6 hours when grinding allowance was 0.15 (mm), setting a time period for the carbonitriding treatment to 8 hours when grinding allowance was 0.175 (mm), and setting a time period for the carbonitriding treatment to 10 hours when grinding allowance was 0.2 (mm).

Figure 27:
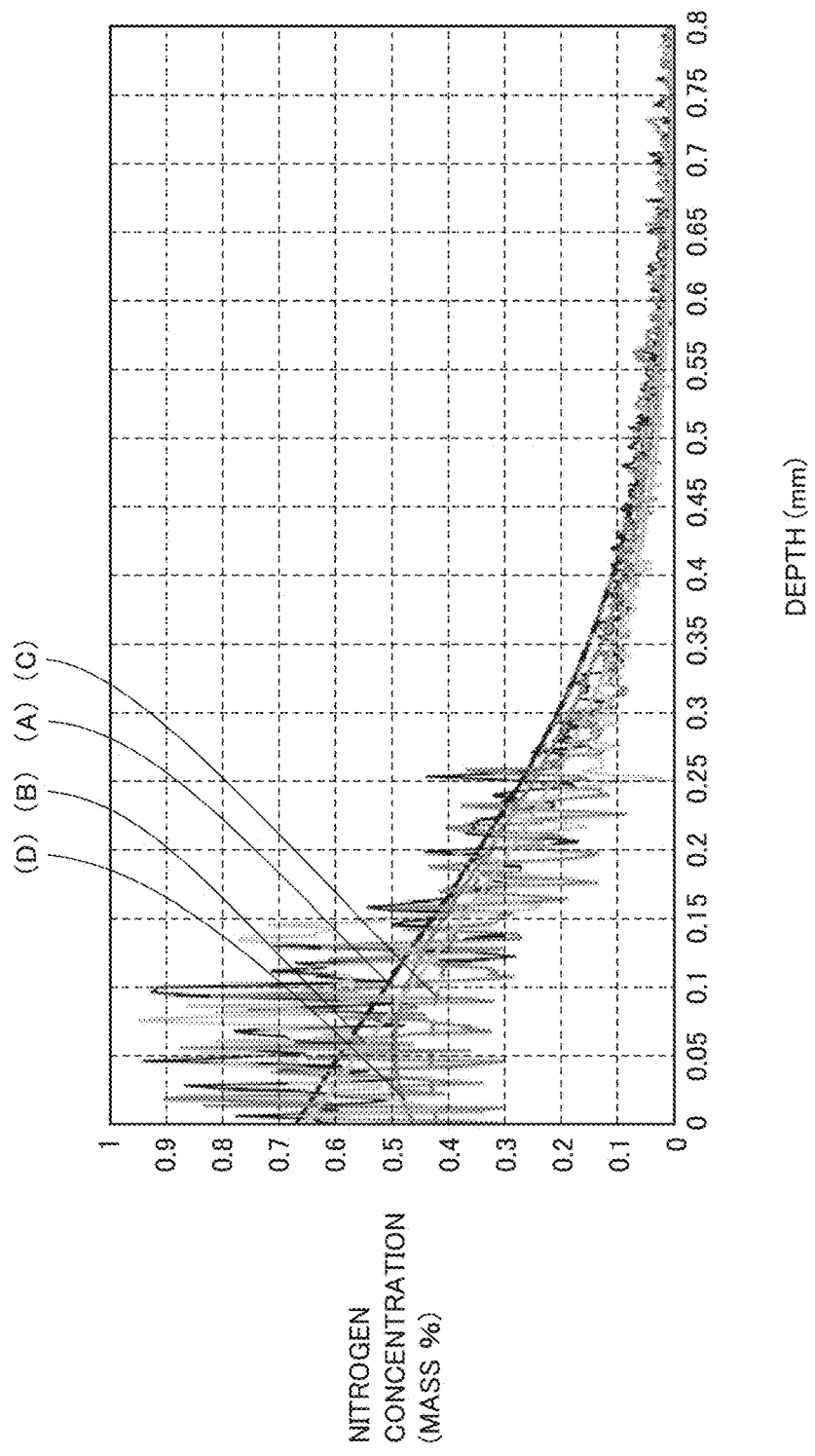
FIG. 27 is a graph showing distribution of nitrogen concentrations in steel after nitrogen diffusion treatment.

(5) Relation Between Nitrogen Diffusion Treatment and Distribution of Nitrogen Concentrations It is effective to perform the nitrogen diffusion treatment after the carbonitriding treatment in order to prevent production of an incompletely quenched structure or lowering in hardness due to an excessive amount of retained austenite. FIG. 27 shows distribution of nitrogen concentrations in steel subjected to the nitrogen diffusion treatment (a measured value and a calculated value). In FIG. 27, the abscissa represents a depth (mm) from the surface and the ordinate represents a nitrogen concentration (mass %). In FIG. 27, (A) represents a calculated value when a time period for the carbonitriding treatment was set to 6 hours and a time period for the nitrogen diffusion treatment was set to 2 hours (a concentration of undecomposed $NH_3$ was 0.1 volume %), (B) represents a calculated value when a time period for the carbonitriding treatment was set to 6 hours and a time period for the nitrogen diffusion treatment was set to 1 hour (a concentration of undecomposed $NH_3$ was 0.05 volume %), (C) represents a calculated value when a time period of the carbonitriding treatment was set to 6 hours and a time period for the nitrogen diffusion treatment was set to 2 hours (a concentration of undecomposed $NH_3$ was 0.05 volume %), and (D) represents a calculated value when a time period for the carbonitriding treatment was set to 4 hours and a time period for the nitrogen diffusion treatment was set to 2 hours (a concentration of undecomposed $NH_3$ was 0.1 volume %). These calculated values were obtained by setting a coefficient of diffusion of nitrogen to $1.2 \times 10^{-6}$ (m²/s). The calculated values shown in (A) to (D) substantially matched with actually measured values.

Then, FEM analysis in which a time period for the carbonitriding treatment and a time period for the nitrogen diffusion treatment were varied was conducted (a time period for the carbonitriding treatment: 4, 5, 6, 7, 8, 9, and 10 hours, a time period for the nitrogen diffusion treatment: 1 hour and 2 hours), and distribution of nitrogen concentrations under each treatment condition was calculated. Then, a regression expression with a result of calculation being defined as an objective variable was calculated. In addition, in consideration of diffusion of nitrogen by 0.03 mm into the inside as a result of high-temperature tempering (heating temperature: 500° C., retention time period: 1 hour) and grinding allowance (0.1 to 0.2 mm) in finishing after heat treatment, expressions (3) and (4) below for determining a position of measurement of a difference in cross-section hardness after high-temperature tempering were constructed. The expression (3) below shows a position ($x_1$) of measurement of a cross-section hardness for ensuring that a nitrogen concentration in the outermost surface of the product is not lower than 0.4 mass %, and the expression (4) shows a position ($x_2$) of measurement of a cross-section hardness for ensuring that a nitrogen concentration in the outermost surface of the product is not lower than 0.3 mass %. In this case, calculation was made with a heating temperature in the nitrogen diffusion treatment being set to 850° C., a concentration of undecomposed $NH_3$ being set to 0.06 volume %, and a carbon activity being set to 0.9.

$$x=0.17935+0.01895 \times T_1+0.06125 \times T_2-1.45 \times 10^{-17} \times T_1^2+0.012 \times T_2^2-0.00625 \times T_1 \times T_2 \quad (3)$$

x: position (mm) of measurement of cross-section hardness, $T_1$: time period (h) for carbonitriding treatment, $T_2$: time period (h) for nitrogen diffusion treatment $$x=0.158233+0.014567 \times T_1+0.0284 \times T_2-4.2 \times 10^{-18} \times T_1^2+0.0036 \times T_2^2-0.0021 \times T_1 \times T_2 \quad (4)$$

x: position (mm) of measurement of cross-section hardness, $T_1$: time period (h) for carbonitriding treatment, $T_2$: time period (h) for nitrogen diffusion treatment (6) Procedure in Quality Assurance Based on results of the discussions in (1) to (5), a procedure for ensuring that a nitrogen concentration in the outermost surface of the product after heat treatment is not lower than 0.4 mass % is as follows. Initially, time period $T_1$ (h) for the carbonitriding treatment and time period $T_2$ (h) for the nitrogen diffusion treatment are substituted into the expression (3) to thereby calculate position $x_1$ (mm) of measurement of a cross-section hardness after high-temperature tempering. Then, high-temperature tempering is carried out with a heating temperature being set to 500° C. and a retention time period being set to 1 hour. Then, a test specimen is cut from the product subjected to high-temperature tempering, a cross-section hardness at calculated position $x_1$ (mm) of measurement and in the unnitrided inside is measured, and a difference in cross-section hardness is calculated based on a difference between measured values. Then, whether or not a difference in cross-section hardness is 80 ΔHV or more is determined. Thus, it can be ensured that a nitrogen concentration in the outermost surface of the ground product is not lower than 0.4 mass % when the difference in cross-section hardness is 80 ΔHV or higher.

When time period $T_1$ for the carbonitriding treatment is set to 6 hours and time period $T_2$ for the nitrogen diffusion treatment is set to 2 hours, it can be ensured based on the expression (3) that a nitrogen concentration in the outermost surface of the product is not lower than 0.4 mass % when a difference in cross-section hardness at a position of depth of 0.4 mm is 80 ΔHV or higher. When time period $T_1$ for the carbonitriding treatment is shorter than 6 hours and time period $T_2$ for the nitrogen diffusion treatment is shorter than 2 hours as well, similarly, evaluation can be made based on a difference in cross-section hardness at a position at a depth of 0.4 mm.

Example 8

Relation between an area ratio of a carbide in the inside and scratched contact life was then investigated. Steel can be solid-solution strengthened by dissolving a carbide therein. Since an area ratio of a carbide in yet-to-be-quenched steel is constant, an amount of solid solution of a carbide can be estimated based on an area ratio of a carbide in the inside after carbonitriding treatment. Here, in spite of the fact that it is quality of a ground surface that affects life of a bearing, the reason why an amount of solid solution of carbon in a base material is estimated based on an area ratio of a carbide in the inside is because the surface is nitrided through carbonitriding treatment and terminal solid solubility of carbon is increased, and therefore it is difficult to estimate an amount of solid solution of a carbide in the base material. Table 2 shows relation between a heat treatment condition and an area ratio (%) of a precipitate (carbide) in the inside.

TABLE 2

| Heat Treatment Condition | Area Ratio of Precipitate in Inside (%) |
| --- | --- |
| 800° C.-180° C.-0.1 mass % N | 12.0 |
| 850° C.-180° C.-0.4 mass % N | 8.3 |
| 880° C.-210° C.-0.4 mass % N | 5.0 |

The heat treatment condition in Table 2 is denoted as "quenching temperature-tempering temperature-nitrogen concentration in ground outermost surface." For example, a denotation 800° C.-180° C.-0.1 mass % shows that a quenching temperature is set to 800° C., a tempering temperature is set to 180° C., and a nitrogen concentration in the surface portion is 0.1 mass %. It was confirmed in Table 2 that an area ratio of the precipitate in the inside was smaller with increase in heating temperature. Namely, by increasing a temperature during carbonitriding treatment, terminal solid solubility of carbon in the base material increases and an amount of solid solution of carbon increases, and thus an amount of the precipitate decreases. When a precipitate is present while terminal solid solubility of carbon has increased, a concentration of carbon in the base material has reached the terminal solid solubility and hence the base material at the surface is also high in concentration of carbon.

Figure 28:
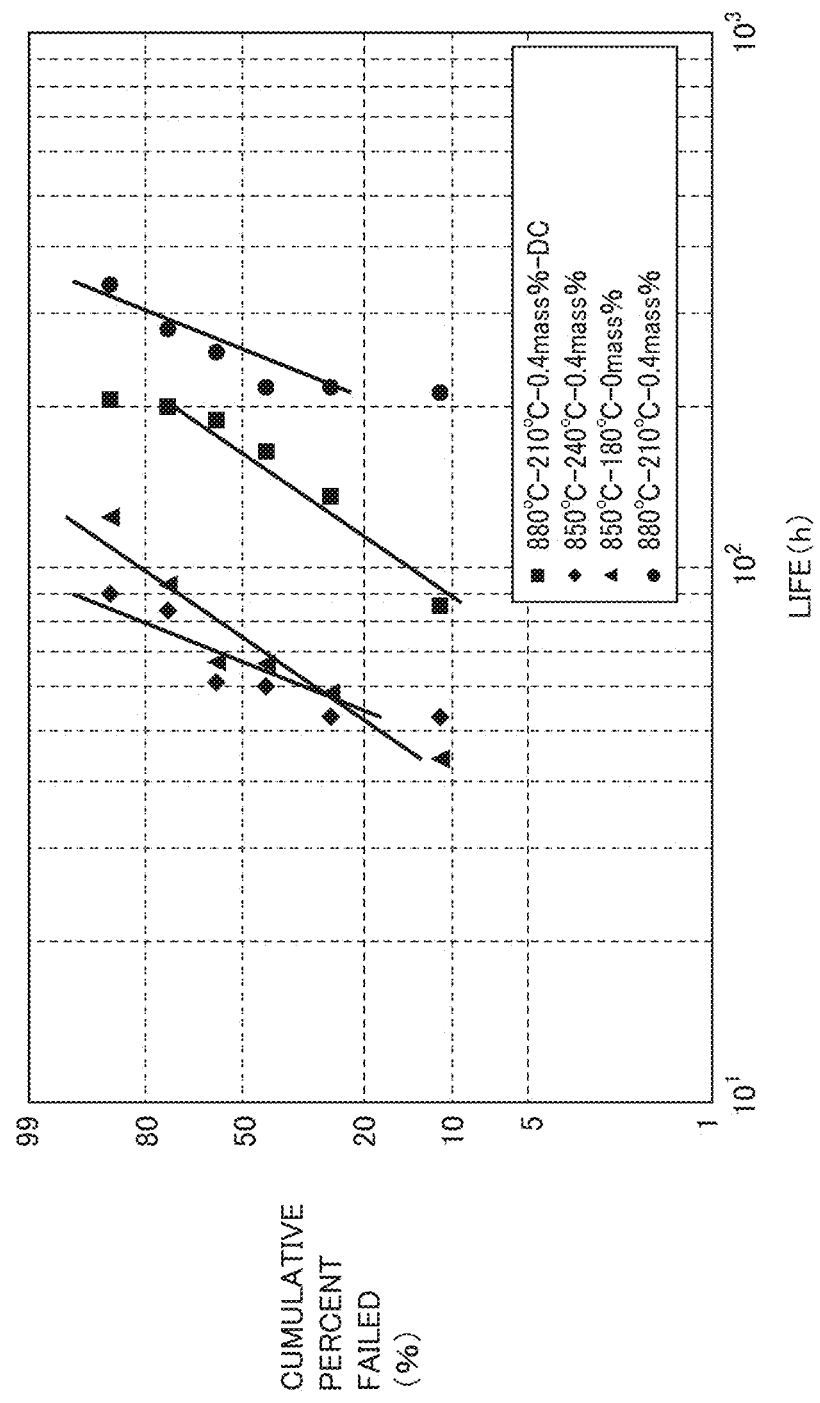
FIG. 28 shows a Weibull plot of scratched contact life.

FIG. 28 shows results of a scratched contact life test. In FIG. 28, the abscissa represents life (a time period from start of the test until flaking occurs) (h) and the ordinate represents cumulative percent failed (%). Legends in FIG. 28 show "quenching temperature-tempering temperature-nitrogen concentration in ground outermost surface" as in Table 2. As shown in FIG. 28, when an area ratio of a precipitate in the inside is low (880° C.-210° C.-0.4 mass %), life was longer than in cases of decarbonization (880° C.-210° C.-0.4 mass % DC), a tempering temperature being high (850° C.-240° C.-0.4 mass %), and a normal quenched product (850° C.-180° C.-0 mass %). In the case of high-temperature tempering, life was shorter because of decrease in concentration of carbon in the base material and decrease in retained austenite, and in the case of decarbonization, life was shorter because of decrease in concentration of carbon in the base material.

It should be understood that the embodiments and examples disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The bearing component and the rolling bearing according to the present invention can particularly advantageously be applied to a bearing component and a rolling bearing required to have improved durability.

REFERENCE SIGNS LIST

1 deep-groove ball bearing; 2 tapered roller bearing; 11, 21 outer ring; 11A, 21A outer ring raceway surface; 11B, 12B, 22B non-ground surface; 12, 22 inner ring; 12A, 22A inner ring raceway surface; 13 ball; 13A, 23A rolling contact surface; 14, 24 cage; 23 roller; 30 atmosphere control step; 31 undecomposed $NH_3$ partial pressure control step; 32 $H_2$ partial pressure control step; 33 $CO/CO_2$ partial pressure control step; and 40 heating pattern control step.

The invention claimed is:

1. A bearing component, composed of steel which contains carbon not less than 0.95 mass % and not more than 1.1 mass %, silicon less than 0.3 mass %, manganese less than 0.5 mass %, sulfur less than 0.008 mass %, and chromium not less than 1.4 mass % and less than 1.6 mass % and is composed of remainder iron and an impurity and having a carbonitrided layer formed at a surface portion including a contact surface which is a surface in contact with other components,
  an average concentration of nitrogen in said surface portion being not lower than 0.3 mass % and not higher than 0.6 mass % and variation in nitrogen concentration in said surface portion being not higher than 0.1 mass %,
  an area ratio of a precipitate in a region where no said carbonitrided layer is formed being not higher than 7%, and
  the surface portion being a region extending from the contact surface to a depth of not more than 20 μm in a direction of thickness of the bearing component.

2. The bearing component according to claim 1, wherein a hardness in said contact surface is not lower than 700 HV.

3. The bearing component according to claim 1, wherein crystal grains of prior austenite have a grain size number not smaller than No. 9 and not greater than No. 11 defined under JIS.

4. The bearing component according to claim 1, wherein an inclination of nitrogen concentration in a direction of thickness of said bearing component is not less than −15 (1/m).

5. The bearing component according to claim 1, wherein an average amount of retained austenite at a position at a depth of 0.05 mm from said contact surface is not lower than 25 volume % and not higher than 35 volume %, and variation in amount of retained austenite at the position at the depth of 0.05 mm from said contact surface is not higher than 3 volume %.

6. The bearing component according to claim 1, wherein an average amount of retained austenite as a whole is not higher than 18 volume %.

7. The bearing component according to claim 1, wherein said surface portion includes five or more carbonitrides per 100 $\mu m^2$, the carbonitrides each having a diameter not greater than 0.5 μm.

8. The bearing component according to claim 1, wherein the nitrogen concentration in a non-ground portion including a non-ground surface which is a surface other than said contact surface is lower than 0.7 mass %.

9. The bearing component according to claim 8, wherein a hardness at a position at a depth of 0.1 mm from said non-ground surface is not lower than 700 HV.

10. The bearing component according to claim 1, wherein after heat treatment in which a heating temperature is set to 500° C. and a retention time period is set to 1 hour, a Vickers hardness at a position at a depth of 0.4 (mm) from said contact surface is higher by at least 80 HV than a Vickers hardness in the region where no said carbonitrided layer is formed in the direction of thickness of said bearing component.

11. A rolling bearing, comprising the bearing component according to claim 1.

* * * * *